(12) United States Patent
Cartsonis et al.

(10) Patent No.: US 10,560,343 B1
(45) Date of Patent: Feb. 11, 2020

(54) PEOPLE CENTRIC MANAGEMENT OF CLOUD NETWORKS VIA GUI

(71) Applicant: Cradlepoint, Inc., Boise, ID (US)

(72) Inventors: Michael A. Cartsonis, Sunnyvale, CA (US); Scott Andrew Hankins, Cupertino, CA (US); Andrew John Mastracci, Kelowna (CA)

(73) Assignee: Cradlepoint, Inc., Boise, ID (US)

(*) Notice: Subject to any disclaimer, the term of this patent is extended or adjusted under 35 U.S.C. 154(b) by 272 days.

(21) Appl. No.: 15/348,902

(22) Filed: Nov. 10, 2016

Related U.S. Application Data

(60) Division of application No. 13/747,371, filed on Jan. 22, 2013, now abandoned, which is a continuation-in-part of application No. 13/675,552, filed on Nov. 13, 2012, which is a continuation-in-part of application No. 13/543,729, filed on Jul. 6, 2012, now Pat. No. 9,118,495.

(51) Int. Cl.
| | |
|---|---|
| *H04L 12/46* | (2006.01) |
| *H04L 12/24* | (2006.01) |
| *H04L 12/18* | (2006.01) |
| *H04L 29/08* | (2006.01) |

(52) U.S. Cl.
CPC ......... *H04L 41/22* (2013.01); *H04L 12/1886* (2013.01); *H04L 12/4641* (2013.01); *H04L 41/0253* (2013.01); *H04L 41/0816* (2013.01); *H04L 41/0893* (2013.01); *H04L 67/02* (2013.01)

(58) Field of Classification Search
CPC ..... H04L 41/22; H04L 67/02; H04L 12/1886; H04L 12/4641; H04L 41/0816; H04L 41/0893; H04L 41/025
See application file for complete search history.

(56) References Cited

U.S. PATENT DOCUMENTS

| | | |
|---|---|---|
| 5,548,646 A | 8/1996 | Aziz et al. |
| 5,968,126 A | 10/1999 | Ekstrom |
| 6,041,166 A | 3/2000 | Hart |
| 6,055,568 A | 4/2000 | Adams |
| 6,195,347 B1 * | 2/2001 | Sehgal ............... H04J 3/12 370/354 |
| 6,442,169 B1 | 8/2002 | Lewis |
| 6,457,061 B1 | 9/2002 | Bal et al. |
| 6,487,600 B1 | 11/2002 | Lynch |
| 6,516,417 B1 | 2/2003 | Pegrum |
| 6,594,272 B1 | 7/2003 | Ketcham |
| 6,609,153 B1 | 8/2003 | Salkewicz |
| 6,614,774 B1 | 9/2003 | Wang |
| 6,640,251 B1 | 10/2003 | Wiget |
| 6,680,945 B1 | 1/2004 | Merchant |
| 6,717,919 B1 | 4/2004 | Ketcham |
| 6,781,982 B1 | 8/2004 | Borella |

(Continued)

OTHER PUBLICATIONS

Chowdhury et al. A survey of network virtualization. Computer Networks 54 (2010) pp. 862-876. (Year: 2010).*

(Continued)

*Primary Examiner* — Pei Yong Weng
(74) *Attorney, Agent, or Firm* — Berkeley Law & Technology Group, LLP

(57) ABSTRACT

Briefly, methods and/or apparatuses are described for network management via a graphical user interface (GUI).

70 Claims, 11 Drawing Sheets

(56) References Cited

U.S. PATENT DOCUMENTS

| | | |
|---|---|---|
| 6,847,620 B1 | 1/2005 | Meier |
| 6,877,041 B2 | 4/2005 | Sullivan |
| 6,937,566 B1 | 8/2005 | Forslow |
| 7,000,012 B2 | 2/2006 | Moore et al. |
| 7,000,015 B2 | 2/2006 | Moore et al. |
| 7,000,079 B2 | 2/2006 | Moore et al. |
| 7,039,687 B1 | 5/2006 | Jamieson |
| 7,043,540 B2 | 5/2006 | Moore et al. |
| 7,072,964 B1 | 7/2006 | Whittle |
| 7,119,713 B2 | 10/2006 | Shuey |
| 7,154,861 B1 | 12/2006 | Merchant |
| 7,194,622 B1 | 3/2007 | Halasz |
| 7,447,166 B1 | 11/2008 | Kaluve et al. |
| 7,480,710 B1 | 1/2009 | Olson |
| 7,519,056 B2 | 4/2009 | Ishwar |
| 7,644,437 B2 | 1/2010 | Volpano |
| 7,743,155 B2 | 6/2010 | Pisharody |
| 7,760,632 B2 | 7/2010 | Yano |
| 7,774,837 B2 | 8/2010 | McAllister |
| 7,937,471 B2 | 5/2011 | Alkhatib |
| 7,941,837 B1 | 5/2011 | Jiang |
| 7,954,145 B2 | 5/2011 | Mohanty |
| 7,961,725 B2 | 6/2011 | Nagarajan et al. |
| 8,036,664 B2 | 10/2011 | Khetawat et al. |
| 8,041,824 B1 | 10/2011 | Maeng |
| 8,150,397 B2 | 4/2012 | Khetawat et al. |
| 8,159,986 B2 | 4/2012 | Yun et al. |
| 8,170,037 B2 | 5/2012 | Polcha |
| 8,189,600 B2 | 5/2012 | Jabr |
| 8,204,502 B2 | 6/2012 | Khetawat et al. |
| 8,228,818 B2 | 7/2012 | Chase et al. |
| 8,230,051 B1 | 7/2012 | Zahavi |
| 8,327,437 B2 | 12/2012 | McAllister |
| 8,422,380 B2 | 4/2013 | Gaskill |
| 8,477,775 B2 | 7/2013 | Choudhary et al. |
| 8,595,359 B2 | 11/2013 | Shaffer |
| 8,619,771 B2 | 12/2013 | Lambeth |
| 8,644,188 B1 | 2/2014 | Brandwine |
| 8,660,129 B1 | 2/2014 | Brendel |
| 8,725,860 B1 * | 5/2014 | Voltmer .................. H04L 41/50 709/220 |
| 8,862,725 B1 * | 10/2014 | Voltmer .............. H04L 61/2007 370/352 |
| 8,966,027 B1 | 2/2015 | Brandwine |
| 9,032,077 B1 | 5/2015 | Klein et al. |
| 9,118,495 B1 | 8/2015 | Hankins |
| 9,154,327 B1 | 10/2015 | Marino |
| 9,306,910 B2 | 4/2016 | Lambeth |
| 9,356,833 B2 | 5/2016 | Xu |
| 9,888,097 B2 | 2/2018 | Lambeth |
| 9,900,410 B2 | 2/2018 | Dalal |
| 9,973,415 B2 | 5/2018 | Cheng |
| 10,110,417 B1 | 10/2018 | Hankins |
| 2001/0042131 A1 | 11/2001 | Mathon |
| 2001/0047407 A1 | 11/2001 | Moore et al. |
| 2002/0012327 A1 | 1/2002 | Okada |
| 2002/0032780 A1 | 3/2002 | Moore et al. |
| 2003/0009540 A1 | 1/2003 | Benfield |
| 2003/0051195 A1 | 3/2003 | Bosa |
| 2003/0140131 A1 | 7/2003 | Chandrashekhar |
| 2003/0198208 A1 | 10/2003 | Koos |
| 2003/0200295 A1 | 10/2003 | Roberts et al. |
| 2004/0017816 A1 | 1/2004 | Ishwar |
| 2004/0156345 A1 | 8/2004 | Steer et al. |
| 2004/0252722 A1 | 12/2004 | Wybenga |
| 2005/0076339 A1 | 4/2005 | Merril |
| 2005/0154790 A1 | 7/2005 | Nagata et al. |
| 2005/0190705 A1 | 9/2005 | Moore et al. |
| 2006/0005185 A1 | 1/2006 | Nguyen |
| 2006/0215582 A1 | 9/2006 | Castagnoli et al. |
| 2007/0070937 A1 | 3/2007 | Demirhan |
| 2007/0121565 A1 | 5/2007 | Halasz |
| 2007/0195800 A1 | 8/2007 | Yang |
| 2007/0201375 A1 * | 8/2007 | Hallinan .................. H04L 45/00 370/252 |
| 2007/0234419 A1 | 10/2007 | Shouno |
| 2008/0049777 A1 | 2/2008 | Morrill et al. |
| 2008/0076419 A1 | 3/2008 | Khetawat et al. |
| 2008/0101367 A1 | 5/2008 | Weinman |
| 2008/0114863 A1 | 5/2008 | Baskey et al. |
| 2008/0148379 A1 | 6/2008 | Xu |
| 2008/0183853 A1 | 7/2008 | Manion |
| 2009/0034431 A1 | 2/2009 | Nagarajan et al. |
| 2009/0046714 A1 | 2/2009 | Holmer et al. |
| 2009/0059930 A1 | 3/2009 | Ryan |
| 2009/0086742 A1 | 4/2009 | Ghai |
| 2009/0106394 A1 | 4/2009 | Lin et al. |
| 2009/0213859 A1 | 4/2009 | Ghai |
| 2009/0129386 A1 | 5/2009 | Rune |
| 2009/0138620 A1 | 5/2009 | Johnson et al. |
| 2010/0061288 A1 | 3/2010 | Yun et al. |
| 2010/0061724 A1 | 3/2010 | Sun |
| 2010/0180014 A1 | 7/2010 | Kannan et al. |
| 2010/0290398 A1 | 11/2010 | Choudhary et al. |
| 2010/0290445 A1 | 11/2010 | Ankaiah |
| 2011/0162060 A1 | 6/2011 | Vijayakumar et al. |
| 2011/0261828 A1 | 10/2011 | Smith |
| 2012/0014387 A1 | 1/2012 | Dunbar |
| 2012/0063451 A1 | 3/2012 | Keesara |
| 2012/0315882 A1 | 12/2012 | Chang et al. |
| 2013/0018994 A1 * | 1/2013 | Flavel ................. H04L 41/0806 709/220 |
| 2013/0044629 A1 | 2/2013 | Biswas |
| 2013/0060966 A1 | 3/2013 | Moisiadis |
| 2013/0121154 A1 | 5/2013 | Guay |
| 2013/0121209 A1 | 5/2013 | Padmanabhan |
| 2013/0163594 A1 | 6/2013 | Sharma |
| 2013/0182712 A1 | 7/2013 | Aguayo et al. |
| 2013/0250951 A1 | 9/2013 | Koganti |
| 2013/0276090 A1 | 10/2013 | Kopti |
| 2013/0287022 A1 | 10/2013 | Banavalikar |
| 2013/0287026 A1 | 10/2013 | Davie |
| 2014/0040750 A1 | 2/2014 | B. et al. |
| 2014/0112343 A1 | 4/2014 | Lambeth et al. |
| 2014/0133354 A1 | 5/2014 | Scharf |
| 2014/0153572 A1 * | 6/2014 | Hampel ............... H04L 12/6418 370/392 |
| 2014/0226652 A1 * | 8/2014 | Rao ........................ H04L 45/04 370/351 |
| 2014/0244847 A1 | 8/2014 | Pouyllau |
| 2014/0282850 A1 * | 9/2014 | Mattes ................ H04L 63/0272 726/1 |
| 2015/0106913 A1 | 4/2015 | Wang |
| 2016/0294638 A1 * | 10/2016 | Masuda ................. H04L 41/22 |
| 2018/0139173 A1 | 5/2018 | Shukla |

OTHER PUBLICATIONS

Onisick, Joe. Network Overlays: An Introduction. Published on Network Computing [https://www.networkcomputing.com] on Dec. 11, 2011. Retrieved [Dec. 16, 2018]. 7 pages. (Year: 2011).*

U.S. Appl. No. 13/675,552: Non-Final Rejection, dated Apr. 3, 2017, 18 pages.

U.S. Appl. No. 13/675,552: Final Rejection, Amendment/Req. Reconsideration—After Non-Final Reject, dated Aug. 3, 2017, 27 pages.

U.S. Appl. No. 13/675,552: Final Rejection, dated Sep. 26, 2017, 21 pages.

U.S. Appl. No. 13/675,552: Response After Final Action, dated Dec. 26, 2017, 20 pages.

U.S. Appl. No. 13/675,552: After Final Consideration Program Decision, Jan. 2, 2018, 4 pages.

U.S. Appl. No. 13/675,552: RCE and Amendments, dated Jan. 26, 2018, 20 pages.

U.S. Appl. No. 13/747,371: Abandonment, Feb. 23, 2017, 2 pages.

U.S. Appl. No. 13/802,529: Non-Final Rejection, dated Mar. 29, 2017, 35 pages.

U.S. Appl. No. 13/802,529: Amendment/Req. Reconsideration—After Non-Final Reject, dated Jun. 29, 2017, 23 pages.

U.S. Appl. No. 13/829,611: RCE and Amendments, dated Feb. 21, 2017, 20 pages.

(56) References Cited

OTHER PUBLICATIONS

U.S. Appl. No. 13/829,611: Non-Final Rejection, dated Mar. 23, 2017, 12 pages.
U.S. Appl. No. 13/829,611: Amendment/Req. Reconsideration—After Non-Final Reject, dated Jun. 22, 2017, 18 pages.
U.S. Appl. No. 13/829,611: Final Rejection, dated Sep. 12, 2017, 16 pages.
U.S. Appl. No. 13/829,611: After Final Consideration Program Request, Dec. 12, 2017, 17 pages.
U.S. Appl. No. 13/829,611: Advisory Action and Amendment, dated Dec. 27, 2017, 5 pages.
U.S. Appl. No. 13/831,306: Supplemental Response or Supplemental Amendment, dated Feb. 21, 2017, 16 pages.
U.S. Appl. No. 13/831,306: Final Rejection, dated Jun. 12, 2017, 11 pages.
U.S. Appl. No. 13/831,306: Response After Final Action, dated Aug. 14, 2017, 15 pages.
U.S. Appl. No. 13/831,306: Advisory Action, dated Aug. 30, 2017, 3 pages.
U.S. Appl. No. 13/831,306: RCE and Amendments, dated Sep. 12, 2017, 33 pages.
U.S. Appl. No. 13/831,306: Non-Final Rejection, dated Oct. 5, 2017, 15 pages.
U.S. Appl. No. 13/831,306: Amendment/Req. Reconsideration—After Non-Final Reject, dated Jan. 5, 2018.
U.S. Appl. No. 13/844,254: Amendment/Req. Reconsideration—After Non-Final Rejection, dated Feb. 28, 2017, 23 pages.
U.S. Appl. No. 13/844,254: Final Rejection, dated Apr. 26, 2017, 16 pages.
U.S. Appl. No. 13/844,254: Response After Final, Jun. 22, 2017, 17 pages.
U.S. Appl. No. 13/844,254: Advisory Action, dated Jun. 30, 2017, 5 pages.
U.S. Appl. No. 13/844,254: RCE and Amendments, dated Aug. 28, 2017, 21 pages.
U.S. Appl. No. 13/844,254: Notice of Allowance and Fees Due, dated Dec. 29, 2017.
U.S. Appl. No. 13/844,254: Notice of Allowance and Fees Due, dated Jan. 10, 2018, 2 pages.
U.S. Appl. No. 13/675,552: Application Data Sheet to update/correct info, Jun. 20, 2018, 8 pages.
U.S. Appl. No. 13/675,552: Filing Receipt, Jul. 10, 2018, 3 pages.
U.S. Appl. No. 13/675,552: Amendment/Req. Reconsideration—After Non-Final Rejection, dated Jul. 20, 2018, 19 pages.
U.S. Appl. No. 13/802,529: Application Data Sheet to update/correct info, Jun. 20, 2018, 7 pages.
U.S. Appl. No. 13/802,529: Filing Receipt, Jul. 10, 2018, 3 pages.
U.S. Appl. No. 13/802,529: Terminal Disclaimer, Aug. 8, 2018, 3 pages.
U.S. Appl. No. 13/829,611: Notice of Allowance and Fees Due, dated May 17, 2018, 13 pages.
U.S. Appl. No. 13/829,611: Notice of Allowance and Fees Due, dated Jun. 4, 2018, 2 pages.
U.S. Appl. No. 13/829,611: Request for Corrected Filing Receipt, Jun. 13, 2018, 7 pages.
U.S. Appl. No. 13/829,611: Filing Receipt, Jun. 18, 2018, 3 pages.
U.S. Appl. No. 13/829,611: Notice of allowance and Fees Due and Amendment, dated Aug. 3, 2018, 16 pages.
U.S. Appl. No. 13/829,611: Notice of allowance and Fees Due, dated Aug. 9, 2018, 2 pages.
U.S. Appl. No. 13/831,306: Final Rejection, dated May 1, 2018, 13 pages.
U.S. Appl. No. 13/831,306: After Final Consideration Program Request, May 10, 2018, 13 pages.
U.S. Appl. No. 13/831,306: Notice of Allowance and Fees Due, dated Jul. 11, 2018, 2 pages.
U.S. Appl. No. 13/831,306: Notice of Allowance and Fees Due, dated Jul. 23, 2018, 2 pages.
U.S. Appl. No. 13/831,306: Notice of Allowance and Fees Due, dated Aug. 3, 2018, 2 pages.
U.S. Appl. No. 13/831,306: Amendment after Notice of Allowance, dated Aug. 27, 2018, 11 pages.
U.S. Appl. No. 15/940,870: Preliminary Amendment, dated Jun. 19, 2018, 185 pages.
U.S. Appl. No. 15/940,870: Filing Receipt, Jul. 10, 2018, 4 pages.
U.S. Appl. No. 15/940,870: Filing Receipt, Jul. 30, 2018, 4 pages.
U.S. Appl. No. 15/940,870: Request for Corrected Filing Receipt, Jul. 26, 2018, 11 pages.
U.S. Appl. No. 16/045,624: Application as filed, Jul. 25, 2018, 102 pages.
U.S. Appl. No. 16/045,624: Preliminary Amendment, dated Jul. 25, 2018, 13 pages.
U.S. Appl. No. 16/045,624: Request for Corrected Filing Receipt, Jul. 26, 2018, 11 pages.
U.S. Appl. No. 16/045,624: Filing Receipt, Aug. 9, 2018, 3 pages.
Mitchell, Bradley, "What is a subnet?" retrieved from http://compnetworking.about.com on Nov. 1, 2015, 3 pages.
Mitchell, Bradley, "What is a Local Area Network (LAN)?" retrieved from http://compnetworking.about.com on Nov. 1, 2015, 3 pages.
Christensson, P., "Domain Definition", 2006, retrieved from http://techterms.com on Nov. 1, 2015
Indiana University, "What is a domain?" from https://kb.iu.edu/d/aoup on retrieved Nov. 1, 2015, 2 pages.
Aerohive Networks, "Areohive Demonstrates Industry First Bonjour Gateway to Enable Apple AirPlay and Apple AirPrint Actoss Multi-Subnet Enterprise Networks," Sunnyvale, CA, Mar. 5, 2012, 3 Pages.
Williams, "Pertino Offers a Cloud-Based Network, No Hardware Required," Feb. 12, 2013, www.techcrunch.com, 3 Pages.
McQuerry, Stephen, CCNA Self-Study (ICND Exam): Extending Switched Networks with Virtual LANs Dec. 5, 2003.
U.S. Appl. No. 13/543,729: Application as filed Jul. 6, 2012, 54 Pages.
U.S. Appl. No. 13/543,729: Filing Receipt, Mailed Jul. 23, 2012, 3 Pages.
U.S. Appl. No. 13/543,729: Application Data Sheet, Mailed Aug. 14, 2012, 7 Pages.
U.S. Appl. No. 13/543,729: Preliminary Amendment, dated Sep. 11, 2012, 6 Pages.
U.S. Appl. No. 13/543,729: Preliminary Amendment, dated Dec. 18, 2012, 15 Pages.
U.S. Appl. No. 13/543,729: Non-Final Office Action, dated Jan. 9, 2014, 20 Pages.
U.S. Appl. No. 13/543,729: Applicant Initiated Interview Summary (PTOL-413), Mailed Feb. 3, 2014, 3 Pages.
U.S. Appl. No. 13/543,729: Non-Final Office Action Response, dated Apr. 9, 2014, 36 Pages.
U.S. Appl. No. 13/543,729: Final Office Action, dated Apr. 30, 2014, 21 Pages.
U.S. Appl. No. 13/543,729: After Final Consideration Program Request, Mailed Jun. 30, 2014, 37 Pages.
U.S. Appl. No. 13/543,729: Amendment After Final or under 37 CFR 1.312, Mailed Jul. 9, 2014, 4 Pages.
U.S. Appl. No. 13/543,729: Request for Continued Examination, Mailed Jul. 16, 2014, 38 Pages.
U.S. Appl. No. 13/543,729: Notice of Allowance and Fees, dated Apr. 23, 2015, 24 pages.
U.S. Appl. No. 13/543,729: Filing Receipt, mailed May 14, 2015, 3 pages.
U.S. Appl. No. 13/543,729: Issue Notification, mailed Aug. 5, 2015, 1 page.
U.S. Appl. No. 13/675,552: Application as filed Nov. 13, 2012, 66 Pages.
U.S. Appl. No. 13/675,552: Filing Receipt and Notice to File Corrected Application Papers, Mailed Dec. 12, 2012, 5 Pages.
U.S. Appl. No. 13/675,552: Applicant Response to Pre-Exam Formalities Notice, Mailed Jan. 3 2013, 10 Pages.
U.S. Appl. No. 13/675,552: Filing Receipt, Mailed Jan. 11, 2013, 3 Pages.
U.S. Appl. No. 13/675,552: Preliminary Amendment, Mailed Apr. 2, 2013, 4 Pages.
U.S. Appl. No. 13/675,552: Non-Final Rejection, dated Oct. 30, 2014, 18 Pages.

(56) References Cited

OTHER PUBLICATIONS

U.S. Appl. No. 13/675,552: Amendment/Req. Reconsideration After Non-Final Rejection filed Mar. 2, 2015, 21 pages.
U.S. Appl. No. 13/675,552: Final Rejection, dated Jun. 3, 2015, 19 pages.
U.S. Appl. No. 13/675,552: Request for Continued Examination and Amendments, filed Dec. 1, 2015, 33 pages.
U.S. Appl. No. 13/675,552: Non Final Rejection, dated Jan. 12, 2016, 20 pages.
U.S. Appl. No. 13/675,552: Amendment/Req. Reconsideration—After Non-Final Rejection, dated May 12, 2016, 18 pages.
U.S. Appl. No. 13/675,552: Final Rejection, dated Aug. 17, 2016, 15 pages.
U.S. Appl. No. 13/675,552: RCE and Amendments, dated Dec. 19, 2016, 23 pages.
U.S. Appl. No. 13/747,371: Application as filed Jan. 22, 2013, 76 Pages.
U.S. Appl. No. 13/747,371: Notice to File Missing Parts and Filing Receipt, Mailed Feb. 15, 2013, 5 Pages.
U.S. Appl. No. 13/747,371: Application Data Sheet, Mailed Mar. 13, 2013, 5 Pages.
U.S. Appl. No. 13/747,371: Notice to File Missing Parts, Mailed Apr. 1, 2013, 22 Pages.
U.S. Appl. No. 13/747,371: Applicant Response to Pre-Exam Formalities Notice, Mailed Jun. 3, 2013, 16 Pages.
U.S. Appl. No. 13/747,371: Filing Receipt, Mailed Jun. 13, 2013, 3 Pages.
U.S. Appl. No. 13/747,371: Non-Final Rejection dated Mar. 2, 2015, 24 pages.
U.S. Appl. No. 13/747,371: Final Rejection dated Nov. 6, 2015, 41 pages.
U.S. Appl. No. 13/747,371: After Final Consideration Program Request, Jan. 7, 2016, 30 pages.
U.S. Appl. No. 13/747,371: Advisory Action and After Final Decision, dated Jan. 29, 2016, 18 pages.
U.S. Appl. No. 13/747,371: RCE, Mar. 4, 2016, 28 pages.
U.S. Appl. No. 13/747,371: Non-Final Rejection, dated Aug. 11, 2016, 8 pages.
U.S. Appl. No. 13/802,529: Application as filed Mar. 13, 2013, 81 Pages.
U.S. Appl. No. 13/802,529: Notice to File Missing Parts and Filing Receipt, Mailed Apr. 23, 2013, 5 Pages.
U.S. Appl. No. 13/802,529: Applicant Response to Pre-Exam Formalities Notice, Mailed May 10, 2013, 9 Pages.
U.S. Appl. No. 13/802,529: Filing Receipt, Mailed May 20, 2013, 3 Pages.
U.S. Appl. No. 13/802,529: Non-Final Office Action, dated Jul. 22, 2014, 17 Pages.
U.S. Appl. No. 13/802,529: Amendment/Req Reconsideration After Non-Final Reject, filed Nov. 5, 2014, 28 Pages.
U.S. Appl. No. 13/802,529: Final Rejection dated Feb. 19, 2015, 27 pages.
U.S. Appl. No. 13/802,529: RCE and Amendments, filed Aug. 17, 2015, 25 pages.
U.S. Appl. No. 13/802,529: Non-Final Rejection, dated Dec. 29, 2015, 38 pages.
U.S. Appl. No. 13/802,529: Amendment/Req. Reconsideration—After Non-Final Rejection, dated Mar. 24, 2016.
U.S. Appl. No. 13/802,529: Final Rejection, dated Jul. 14, 2016, 38 pages.
U.S. Appl. No. 13/802,529: Response After Final Action, dated Oct. 14, 2016, 44 pages.
U.S. Appl. No. 13/802,529: Advisory Action, dated Nov. 7, 2016, 3 pages.
U.S. Appl. No. 13/802,529: Response After Final Action, dated Dec. 9, 2016, 27 pages.
U.S. Appl. No. 13/802,529: Advisory Action, dated Dec. 29, 2016, 4 pages.
U.S. Appl. No. 13/802,529: RCE and Amendments, dated Jan. 6, 2017, 25 pages.
U.S. Appl. No. 13/829,611: Application as filed Mar. 14, 2013, 83 Pages.
U.S. Appl. No. 13/829,611: Notice to File Missing Parts and Filing Receipt, Mailed May 2, 2013, 5 Pages.
U.S. Appl. No. 13/829,611: Applicant Response to Pre-Exam Formalities Notice, Mailed Jun. 7, 2013, 5 Pages.
U.S. Appl. No. 13/829,611: Filing Receipt, Mailed Jul. 9, 2013, 3 Pages.
U.S. Appl. No. 13/829,611: Non-Final Rejection, dated Jun. 16, 2015, 14 pages.
U.S. Appl. No. 13/829,611: Amendment/Req. Reconsideration After Non-Final Reject, filed Dec. 15, 2015, 22 pages.
U.S. Appl. No. 13/829,611: Final Rejection, dated Dec. 30, 2016, 16 pages.
U.S. Appl. No. 13/829,611: After Final Consideration Program Request, Mar. 24, 2016, 21 pages.
U.S. Appl. No. 13/829,611: Advisory Action and After Final Decision, dated Apr. 5, 2016, 7 pages.
U.S. Appl. No. 13/829,611: RCE, May 2, 2016, 25 pages.
U.S. Appl. No. 13/829,611: Non-Final Rejection, dated Jun. 16, 2016, 16 pages.
U.S. Appl. No. 13/829,611: Amendment/Req. Reconsideration—After Non-Final Reject, dated Sep. 16, 2016, 19 pages.
U.S. Appl. No. 13/829,611: Final Rejection, dated Oct. 5, 2017, 14 pages.
U.S. Appl. No. 13/829,611: Response After Final Action, dated Jan. 5, 2017, 17 pages.
U.S. Appl. No. 13/829,611: Advisory Action, dated Jan. 30, 2017, 3 pages.
U.S. Appl. No. 13/831,306: Application as filed Mar. 14, 2013, 88 Pages.
U.S. Appl. No. 13/831,306: Notice to File Missing Parts and Filing Receipt, Mailed May 6, 2013, 5 Pages.
U.S. Appl. No. 13/831,306: Applicant Response to Pre-Exam Formalities Notice, Mailed Jun. 27, 2013, 6 Pages.
U.S. Appl. No. 13/831,306: Filing Receipt, Mailed Jul. 9, 2013, 3 Pages.
U.S. Appl. No. 13/831,306: Non-Final Rejection, dated Jun. 25, 2015, 13 pages.
U.S. Appl. No. 13/831,306: Amendment/Req. Reconsideration—After Non-Final Rejection, dated Dec. 28, 2016, 25 pages.
U.S. Appl. No. 13/831,306: Final Rejection, dated Mar. 22, 2016, 15 pages.
U.S. Appl. No. 13/831,306: Response After Final Action, dated Jul. 19, 2016, 19 pages.
U.S. Appl. No. 13/831,306: Advisory Action, dated Jul. 22, 2016, 3 pages.
U.S. Appl. No. 13/831,306: Filing Receipt, Jul. 27, 2016 4 pages.
U.S. Appl. No. 13/831,306: RCE and Amendments, dated Aug. 22, 2016, 10 pages.
U.S. Appl. No. 13/831,306: Non-Final Rejection, dated Sep. 28, 2016, 12 pages.
U.S. Appl. No. 13/831,306: Amendment/Req. Reconsideration—After Non-Final Reject, Jan. 6, 2017, 15 pages.
U.S. Appl. No. 13/844,254: Application as filed Mar. 15, 2013, 99 Pages.
U.S. Appl. No. 13/844,254: Notice to File Missing Parts and Filing Receipt, Mailed May 9, 2013, 5 Pages.
U.S. Appl. No. 13/844,254: Applicant Response to Pre-Exam Formalities Notice, Mailed Jun. 27, 2013, 5 Pages.
U.S. Appl. No. 13/844,254: Filing Receipt, Mailed Jul. 9, 2013, 3 Pages.
U.S. Appl. No. 13/844,254: Non-Final Rejection and Examiner Search, dated Aug. 4, 2015, 17 pages.
U.S. Appl. No. 13/844,254: Amendment/Req. Reconsideration—After Non-Final Rejection, Jan. 4, 2016, 40 pages.
U.S. Appl. No. 13/844,254: Final Rejection, dated Apr. 7, 2016, 27 pages.
U.S. Appl. No. 13/844,254: Response After Final Action, dated Jul. 7, 2016, 48 pages.
U.S. Appl. No. 13/844,254: Advisory Action, dated Jul. 20, 2016, 2 pages.

(56) References Cited

OTHER PUBLICATIONS

U.S. Appl. No. 13/844,254: RCE and Amendments, dated Aug. 8, 2016, 50 pages.
U.S. Appl. No. 13/844,254: Non-Final Rejection, dated Nov. 29, 2016, 13 pages.
U.S. Appl. No. 13/675,552: Non-Final Rejection, dated Mar. 22, 2018, 19 pages.
U.S. Appl. No. 13/802,529: Non-Final Rejection, dated Feb. 7, 2018, 35 pages.
U.S. Appl. No. 13/829,611: RCE and Amendments, dated Mar. 7, 2018, 25 pages.
U.S. Appl. No. 13/844,254: Amendment after Notice of Allowance, dated Mar. 21, 2018, 13 pages.
U.S. Appl. No. 13/844,254: Amendment after Notice of Allowance, dated Mar. 26, 2018, 12 pages.
U.S. Appl. No. 13/844,254: Issue Fee Payment, Mar. 28, 2018, 1 page.
U.S. Appl. No. 15/940,870: Application and Preliminary Amendment, dated Mar. 29, 2018, 114 pages.
U.S. Appl. No. 15/940,870: Notice to File Corrected Application Papers, Apr. 25, 2018, 2 pages.
U.S. Appl. No. 15/940,870: Filing Receipt, Apr. 25, 2018, 4 pages.
U.S. Appl. No. 13/675,552: Response After Final Action, dated Jan. 25, 2019, 20 pages.
U.S. Appl. No. 13/675,552: Advisory Action, dated Feb. 8, 2019, 2 pages.
U.S. Appl. No. 13/675,552: RCE and Amendment, dated Feb. 15, 2019, 23 pages.
U.S. Appl. No. 13/675,552: Non-Final Rejection, dated Mar. 14, 2019, 28 pages.
U.S. Appl. No. 13/802,529: Issue Notification, Dec. 20, 2018, 1 page.
U.S. Appl. No. 16/125,578: Notice of Publication, Mar. 7, 2019, 1 page.
U.S. Appl. No. 16/277,911: Application as filed Feb. 15, 2019, 99 pages.
U.S. Appl. No.16/277,911: Filing Receipt, Mar. 6, 2019, 4 pages.
U.S. Appl. No. 16/128,985: Notice of Publication, Mar. 14, 2019, 1 page.
U.S. Appl. No. 16/277,926: Application as filed Feb. 15, 2019, 114 pages.
U.S. Appl. No. 16/277,926: Filing Receipt, Mar. 5, 2019, 4 pages.
U.S. Appl. No. 15/940,870: Terminal Disclaimer and Amendment/Req. Reconsideration—After Non-Final Reject, Dec. 27, 2018, 21 pages.
U.S. Appl. No. 15/940,870: Notice of Allowance and Fees Due, dated Jan. 30, 2019, 6 pages.
U.S. Appl. No. 16/045,624: Amendment/Req. Reconsideration—After Non-Final Reject, Dec. 27, 2018, 21 pages.
U.S. Appl. No. 16/045,624: Final Rejection, dated Jan. 29, 2019, 11 pages.
U.S. Appl. No. 16/045,624: Response After Final Action, dated Mar. 19, 2019, 5 pages.
U.S. Appl. No. 16/045,624: Terminal Disclaimer, Mar. 19, 2019, 4 pages.
U.S. Appl. No. 13/675,552: Final Rejection, dated Nov. 23, 2018, 7 pages.
U.S. Appl. No. 13/802,529: Notice of Allowance and Fees Due, dated Sep. 5, 2018, 22 pages.
U.S. Appl. No. 13/802,529: Issue Fee Payment, Nov. 30, 2018, 1 page.
U.S. Appl. No. 13/802,529: Amendment after Notice of Allowance, dated Nov. 30, 2018, 3 page.
U.S. Appl. No. 16/192,539: Application as filed Nov. 15, 2018, 87 pages.
U.S. Appl. No. 16/192,539: Notice to File Missing Parts, Dec. 7, 2018, 2 pages.
U.S. Appl. No. 16/192,539: Filing Receipt, Dec. 7, 2018, 3 pages.
U.S. Appl. No. 13/829,611: Notice of Allowance and Fees Due, dated Sep. 14, 2018, 3 pages.
U.S. Appl. No. 13/829,611: Issue Notification, Oct. 3, 2018, 1 page.
U.S. Appl. No. 16/125,578: Application as filed Sep. 7, 2018, 91 pages.
U.S. Appl. No. 16/125,578: Notice to File Missing Parts, Sep. 27, 2018, 2 pages.
U.S. Appl. No. 16/125,578: Filing Receipt, Sep. 27, 2018, 3 pages.
U.S. Appl. No. 16/125,578: Applicant Response to Pre-Exam Formalities Notice and Preliminary Amendment, Nov. 27, 2018, 28 pages.
U.S. Appl. No. 16/125,578: Filing Receipt, Nov. 29, 2018, 3 pages.
U.S. Appl. No. 13/831,306: Response to Amendment under Rule 312, Sep. 5, 2018, 3 pages.
U.S. Appl. No. 13/831,306: Issue Fee Payment, Sep. 7, 2018, 1 page.
U.S. Appl. No. 13/831,306: Notice of Allowance and Fees Due, dated Oct. 9, 2018, 2 pages.
U.S. Appl. No. 13/831,306: Issue Notification, Oct. 31, 2018, 1 page.
U.S. Appl. No. 16/128,985: Application as filed Sep. 12, 2018, 106 pages.
U.S. Appl. No. 16/128,985: Notice to File Missing Parts, Oct. 2, 2018, 2 pages.
U.S. Appl. No. 16/128,985: Filing Receipt, Oct. 2, 2018, 4 pages.
U.S. Appl. No. 16/128,985: Preliminary Amendment, dated Dec. 3, 2018, 13 pages.
U.S. Appl. No. 16/128,985: Request for Corrected Filing Receipt, Dec. 3, 2018, 6 pages.
U.S. Appl. No. 16/128,985: Filing Receipt, Dec. 6, 2018, 4 pages.
U.S. Appl. No. 15/940,870: Preliminary Amendment, dated Sep. 7, 2018, 11 pages.
U.S. Appl. No. 15/940,870: Request for Corrected Filing Receipt, Oct. 31, 2018, 6 pages.
U.S. Appl. No. 15/940,870: Non-Final Rejection, dated Nov. 1, 2018, 14 pages.
U.S. Appl. No. 15/940,870: Filing Receipt, Nov. 2, 2018, 4 pages.
U.S. Appl. No. 15/940,870: Notice of Publication, Nov. 8, 2018, 1 page.
U.S. Appl. No. 16/045,624: Non-Final Rejection, dated Nov. 1, 2018, 11 pages.
U.S. Appl. No. 16/045,624: Notice of Publication, Nov. 15, 2018, 1 page.
U.S. Appl. No. 16/045,624: Filing Receipt, Dec. 4, 2018, 4 pages.
U.S. Appl. No. 13/675,552: Final Rejection, dated Sep. 23, 2019, 27 pages.
U.S. Appl. No. 16/192,539: Terminal Disclaimer Approved, Aug. 9, 2019, 3 pages.
U.S. Appl. No. 16/192,539: Notice of Allowance and Fees Due, dated Aug. 14, 2019, 15 pages.
U.S. Appl. No. 16/125,578: Non-Final Rejection, dated Sep. 5, 2019, 7 pages.
U.S. Appl. No. 16/128,985: Non-Final Rejection, dated Aug. 21, 2019, 6 pages.
U.S. Appl. No. 16/277,926: Non-Final Rejection, dated Oct. 2, 2019, 6 pages.
U.S. Appl. No. 16/045,624: Issue Notification, dated Jul. 31, 2019, 1 page.
U.S. Appl. No. 16/405,825: Notice of Publication, dated Aug. 29, 2019, 1 page.
U.S. Appl. No. 13/675,552: Response to Final Office action dated Nov. 22, 2019, 27 pages.
U.S. Appl. No. 13/675,552: Advisory Action dated Dec. 2, 2019, 3 pages.
U.S. Appl. No. 16/720,448: Continuation Application filed Dec. 19, 2019, 81 pages.
U.S. Appl. No. 16/192,539: Issue Fee Payment dated Nov. 11, 2019, 6 pages.
U.S. Appl. No. 16/192,539: Corrected Notice of Allowability dated Nov. 12, 2019, 6 pages.
U.S. Appl. No. 16/192,539: Issue Notification dated Nov. 20, 2019, 1 page.
U.S. Appl. No. 16/688,846: Continuation Application filed Nov. 19, 2019, 93 pages.
U.S. Appl. No. 16/688,846: filed Dec. 5, 2019, 4 pages.

(56) References Cited

OTHER PUBLICATIONS

U.S. Appl. 16/688,846: Notice to File Missing Parts dated Dec. 5, 2019, 2 pages.
U.S. Appl. No. 16/125,578: Amendment and Terminal Disclaimer dated Dec. 5, 2019, 18 pages.
U.S. Appl. No. 16/128,985: Amendment and Terminal Disclaimer dated Nov. 11, 2019, 21 pages.
U.S. Appl. No. 16/277,926: Non-final Office Action dated Oct. 2, 2019, 9 pages.

* cited by examiner

FIG. 8 pertino

Hi Gordon,

Frank wants to connect with you on the Launch Design Network.
Do you want to accept his connection request?

Accept Connection

©Pertino Inc

PEOPLE CENTRIC MANAGEMENT OF CLOUD NETWORKS VIA GUI

FIELD

The present application relates to management of a network via a graphical user interface (GUI).

BACKGROUND

Various advancements in networking address interoperability of one or more devices across one or more networks. Two different physical networks may communicate via a network device. A network device, such as a router, may create a hardware bridge between two networks. Additionally, a remote device, such as a device on a remote network, for example, may communicate with a local network by executing a virtual private network (VPN), typically by executing a software program. In this context (e.g., throughout this document), the term "remote" or similar terms refer to the device not being a part of a particular network and the term "local" or similar terms refer to a collection of devices, for example, that are part of that network. VPN software, for example, may create a reasonably secure channel of communication between a remote device and local network and may route traffic to the remote device. This may allow the remote device to communicate with the local network as if the remote device were part of the local network, rather than remote. Unfortunately, such approaches have various drawbacks including, for example, that they may be difficult and/or expensive to implement without deep technical know-how.

BRIEF DESCRIPTION OF THE DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

FIG. 2-10 are schematic diagrams illustrating various embodiments of different display screens for an example GUI that may be employed to manage a network;

Figure 1:
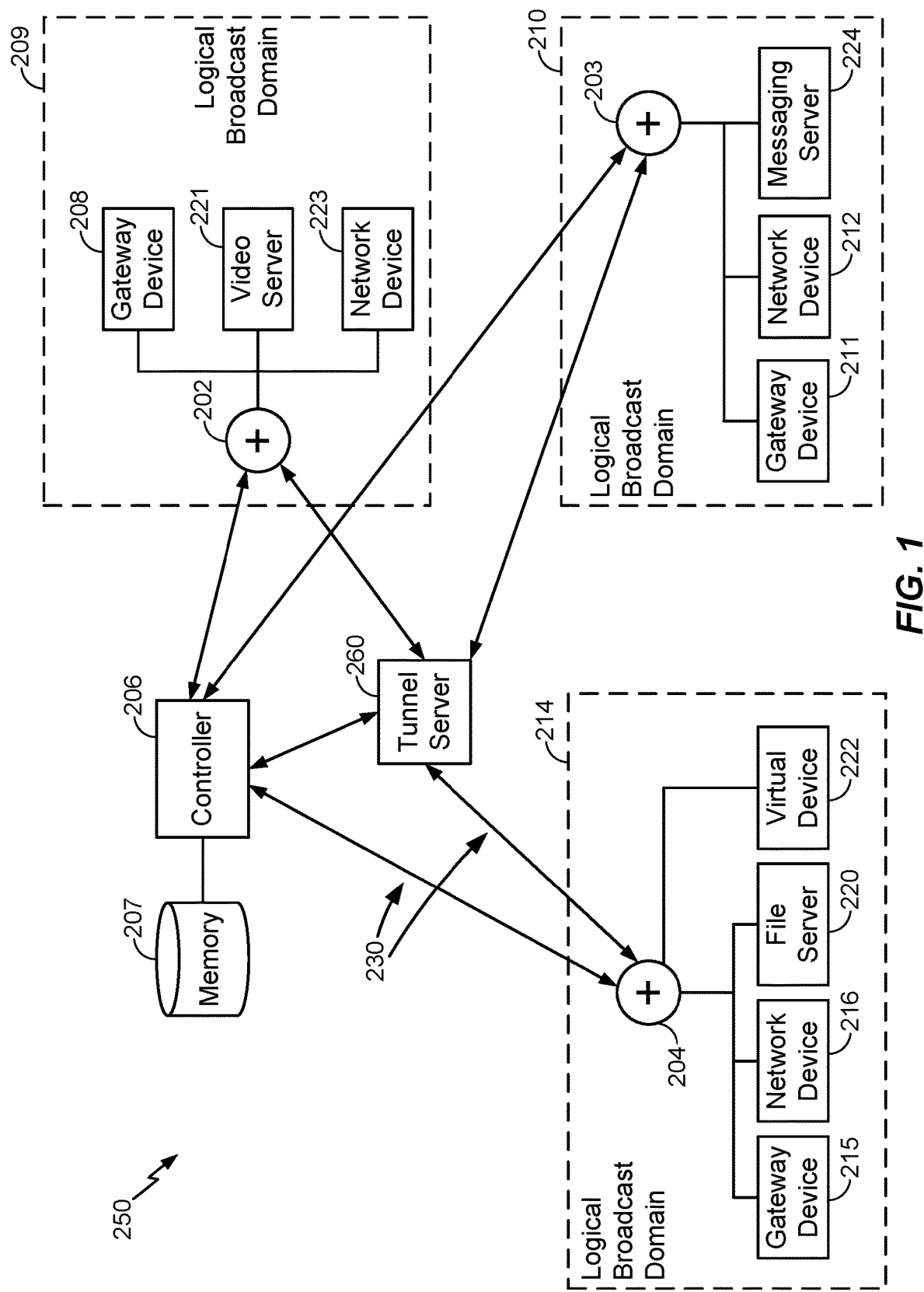
FIG. 1 is a schematic diagram illustrating an embodiment of a network.

Reference is made in the following detailed description to accompanying drawings, which form a part hereof, wherein like numerals may designate like parts throughout to indicate corresponding and/or analogous components, for example. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or similar references, for example, up, down, top, bottom, and so on, may be used to facilitate discussion of drawings and/or are not intended to restrict application of claimed subject matter. Therefore, the following detailed description is not to be taken to limit claimed subject matter and/or equivalent.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more elements are in direct physical or electrical contact; however, "coupled" may also mean that two or more elements are not in direct contact, but may nonetheless cooperate or interact. The term coupled may also be understood to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to devices communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain, explained in more detail herein, may comprise an example of a private network. It is understood in this context that a private network may provide outgoing communications to devices not in the private network, but such devices outside the private network may not direct inbound communications to devices included in the private network.

The Internet refers to a decentralized global network of interoperable networks. The Internet includes local area networks (LANs), wide area networks (WANs), wireless networks, and/or long haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Although physically connecting a network via a hardware bridge is done, there may be one or more drawbacks. A hardware bridge may not typically include a capability of interoperability via higher levels of a network protocol. A network protocol refers to a set of signaling conventions for communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance or substantial compatibility.

Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. Therefore, for example, a hardware bridge may be unable to forward signal packets since it may operate at a layer of a communication stack that does not provide that capability.

Although higher layers of a network protocol may, for example, affect device communication permissions, user communication permissions, etc., a hardware bridge, for example, may typically provide little user control, such as for higher layer functions. Another drawback, as mentioned previously, is that it may be difficult, time consuming and/or expensive to setup and/or modify features of a hardware bridge without specialized skills and/or experience, such as technical know-how.

A VPN, such as previously described, may enable a remote device to communicate via a local network, but may also have drawbacks. A router may allow communications in the form of transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, which may be limiting, for example, in some situations. Similarly, here too, as mentioned previously, it may be difficult, time consuming and/or expensive to setup and/or modify features of a VPN without specialized skills and/or experience, such as technical know-how.

A network may be very large, such as comprising thousands of nodes, millions of nodes, billions of nodes, or more, as examples. As the number of network devices communicating via a network grow, signals transmissions via a network, such as in the form of signal packets, for example, may begin to interfere. Thus, it may be desirable to create and/or generate a logical, private network, such as via (e.g., over) the world wide web (WWW), to in effect limit the number of signal transmissions without necessarily limiting geographies, for example, by having portions of a logical, private network in geographies of potential interest. In addition, it may be possible to purchase available capacity, such as memory and/or processing capacity, as examples, in separate markets, such as markets where costs may be appealing, providing another potential benefit.

Although a router may link otherwise independent LANs through routing of signal packets, a router may also provide some limits on signal packet transmissions to a select set of devices, for example. A router may limit signal packet transmissions via implicitly or explicitly producing a broadcast domain (also referred to as BD or as a broadcast domain). In this context, the term broadcast domain refers to a set of devices, including associated services and/or support, occupying an address space, such as a local network address space, in which any device is able to communicate with any other device in the broadcast domain without rerouting a transmission, such as a signal packet, for example. Although claimed subject matter is not necessarily limited in scope in this respect, additional example embodiments of a broadcast domain (along with related technology) are discussed in U.S. patent application Ser. No. 13/543,729, titled "COMMUNICATION BETWEEN BROADCAST DOMAINS," filed on Jul. 6, 2012, by Hankins et al., herein incorporated by reference in its entirety and assigned to the assignee of currently claimed subject matter. For example, a signal packet may be transmitted to other devices in a broadcast domain without being directed or redirected via a router or similar device, such as a device capable of affecting routing of signal packets, for example. Using a router or a similar device able to perform network address translation (NAT), portions of networks may be logically separate and independent such that transmissions in the form of signal packets by a network device on a network, for example, may not necessarily be forwarded from the BD unless a destination having a particular destination address of a signal packet transmission exists outside the particular broadcast domain. This type of approach effectively illustrates one example of logically independent and separate (e.g., non-overlapping) divisions of a network, in which the divisions may comprise examples of respective broadcast domains.

Examples of broadcast domains may include logical BDs, virtual BDs, physical BDs or non-virtual BDs. For example, in this context, a physical BD refers to a traditional BD comprising a set of physical devices, in which a physical device is able to communicate with another physical device in the broadcast domain, e.g., as previously explained, without being rerouted. For example, a signal packet may be transmitted from one device in the BD to another device in the BD without being directed or redirected via a router or similar device, such as a device capable of affecting routing of signal packets, for example. In contrast, a virtual BD refers to a BD that includes at least some virtual components within the BD, such as a virtual device, and/or to a BD in which physical devices are linked, such as via a tunnel server, for example. In this context, the term linked, such as, for example, if used to refer to devices in separate BDs refers to allowing signal packets to communicate between broadcast domains as if the broadcast domains are not separate, but without substantially changing the broadcast domain configuration of the separate broadcast domains. Again, although claimed subject matter is not necessarily limited in scope in this respect, additional example embodiments (along with related technology) are discussed in aforementioned U.S. patent application Ser. No. 13/543,729. The terms linked, logically joined and/or similar terms are used interchangeably in this context. Likewise, in this context, a virtual broadcast domain may be generated and/or created by linking broadcast domains at least for a period of time. A virtual BD operates like (e.g., similar to) a physical BD, however, a virtual device in the BD, for example, is not necessarily associated with the same particular physical devices at all times. For example, a virtual device in the virtual BD, may move from one physical device to a different physical device, as a simple example, and remain in the BD where, for example, state of the device, although virtual, is maintained. Thus, while a virtual device in the BD necessarily executes on a physical device, it does not necessarily always execute on the same physical device at all times.

A broadcast domain may also be referred to as a logical broadcast domain (also referred to as LBD). A logical broadcast domain may comprise a virtual broadcast domain and/or a physical broadcast domain. A logical broadcast domain that includes a virtual broadcast domain, for example, may refer to a logical broadcast domain in which spatial confines, so to speak, of at least portions of the broadcast domain may not be entirely related to a particular set of physical devices. For example, some devices in the BD may not be consistently limited or associated with any particular physical devices. Some devices of the broadcast domain, for example, may be logically independent of physical devices, as alluded to above in connection with discussion of a virtual BD.

Along similar lines, a virtual local area network (VLAN) may, for example, comprise a logical partition or sub-partition of an otherwise physical LAN and/or logically joined (e.g., linked) logical partitions or logical sub-partitions of multiple physical LANs, for example. Likewise, a virtual network may comprise a similar concept in which logical partitions or sub-partitions of LANs, VLANs or virtual broadcast domains, may, for example, in an embodiment, be logically joined (e.g., linked) at least for a period of time. A non-virtual broadcast domain simply is another way to refer to a physical BD since it refers to a broadcast domain in which the broadcast domain devices exclude any virtual devices. Thus, devices in a non-virtual BD may comprise physical devices, such as a router, a computing platform (that includes a computing device, for example), a network device, etc. The term broadcast domain is also used in a generic sense meaning that it is not limited exclusively to a broadcast type of signal packet transmission scheme and/or may include in addition to and/or in place of a broadcast, other types of signal packet transmission schemes, such as, but not limited to, anycast, broadcast, multicast, unicast, geocast, the like, or any combinations thereof.

As previously indicated, a network device comprises a device capable of communicating via a network. For example, network devices may comprise computing devices, non-computing devices, and/or other devices. A network device may comprise, as non-limiting examples, a router, gateway, hub, switch, host, mobile device, server, client, the like, or any combinations thereof. A server may comprise a network device capable of serving content. For example, a server may provide now known and/or to be later developed, server arrangements, derivatives, and/or improvements, including past, present, and/or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

As indicated above, a logical broadcast domain refers to at least a logical division of a network comprising a plurality of network devices such that network devices communicating via the logical division of the network may communicate with other network devices communicating via the logical division without use of a router or other network device capable of limiting network communications. For example, as a non-limiting illustration, a single logical broadcast domain may be constructed using multiple repeaters, hubs, NAT devices, or switches, whereby a network device communicating via one of the multiple repeaters, hubs, NAT devices or switches may communicate with another network device communicating via one of the repeaters, hubs, NAT devices or switches.

In this context, the term logical broadcast domain configuration refers to various hardware devices, firmware, and/or software applications (if residing in one or more locations within a LBD so as to be capable of being accessed or executed electronically, such as via a computing device) supporting a logical broadcast domain. As used in this specification, a logical broadcast domain configuration, therefore, may include stored signal packets relating to one or more features of a logical broadcast domain. For example, a configuration may represent, characterize and/or specify information, although in physical form, such as signals, related to one or more features, and/or other stored information, again, in physical form, such as memory states, relating to one or more features of a network device communicating via the logical broadcast domain, such as to represent, characterize and/or specify the one or more features of the LBD. Although claimed subject matter is not necessarily limited in scope in this respect, additional example embodiments of a broadcast domain configuration (along with related technology) are discussed in aforementioned U.S. patent application Ser. No. 13/543,729.

For example, a broadcast domain configuration may include a subset of, and/or additions to the following non-limiting illustrative examples of features: one or more network protocols, available addresses, used addresses, topologies, devices used, such as switches or hubs, historical settings, such as for security, for a network protocol, etc., modifications of the foregoing, user accounts, including status, authentication, etc., security settings of a broadcast domain, workgroup or domain names, device names including status, available device features, etc., services available and/or used, status of the network devices, as well as other features.

In one example illustrative embodiment, use of a network device, for example, may allow network devices communicating via their respective logical broadcast domains, for example, to discover and/or request services available via network devices of another logical broadcast domain while still communicating via their respective logical broadcast domains, potentially with less complexity, traffic and/or expense than simply implementing signal packet forwarding. In this context, the term gateway device may also be employed to refer to a network device able to link logical broadcast domains via a tunnel serve. As a matter of convenience, it is understood that any network device may include such a capability, such as, for example, if loaded with software providing an appropriate capability, as described in more detail throughout this specification. Therefore, it is not intended that the term gateway be used in this document to exclusively refer to devices having such capability. Likewise, in this context, the term linking logical broadcast domains refers to allowing signal packets to communicate between logically separate broadcast domains as if the logical broadcast domains are not separate, but without substantially changing the broadcast domain configuration of the separate, logical broadcast domains. The terms linked, logically joined and/or similar terms are used interchangeably in this context. Likewise, in this context, a virtual broadcast domain may be generated and/or created by linking logical broadcast domains at least for a period of time. It is also noted that in an embodiment or implementation, a logical broadcast domain may comprise a single and/or remote stand-alone device.

Thus, in one embodiment, devices communicating as part of a virtual broadcast domain, may communicate with devices operating as part of a non-virtual broadcast domain, respectively, for example. In one illustrative embodiment, this may be accomplished via use of a tunnel server linking several gateway devices, for example. A tunnel server may, for example, execute software capable of receiving and/or sending signal packets from gateway devices in different logical broadcast domains. Different logical broadcast domains may otherwise use separate routers, for example. Typically, therefore, different logical broadcast domains may occupy separate network address spaces, such as separate IP address spaces, as an example. Also, typically, routers may provide network address translation so that signal packets may be properly routed after leaving a particular logical broadcast domain. However, if, for example, separate routers for respective BDs include a routing table, or similar mechanism, such that signal packets intended to reach another logical broadcast domain are routed to a tunnel server, in this example embodiment, as a result, network address translation may be by-passed. Gateway devices in separate logical broadcast domains may, therefore, communicate with and/or via a tunnel server. A tunnel server may forward traffic (e.g., signal packet transmissions) between gateway devices, such as for communications between different logical broadcast domains. Although claimed subject matter is not necessarily limited in scope in this respect, additional example embodiments of a tunnel server (along with related technology) are discussed in U.S. patent application Ser. No. 13/675,552, titled "LINKING LOGICAL BROADCAST DOMAINS," filed on Nov. 13, 2012, by Hankins et al., herein incorporated by reference in its entirety and assigned to the assignee of currently claimed subject matter.

Thus, for example, if a virtual broadcast domain provides a signal packet A to a tunnel server, it may be encapsulated. Likewise, if a non-virtual broadcast domain provides a signal packet B to a tunnel server it may be encapsulated. However, in this embodiment, a tunnel server may likewise remove encapsulation (e.g., referred to as termination) to determine where to forward a signal packet and re-encapsulate it for forwarding. Likewise, in an embodiment, as a few non-limiting illustrative examples, encapsulation may include encryption as well, or may separate encapsulation from termination. Of course, use of gateway devices and/or tunnel servers may involve much more complex network transmission and/or routing arrangements as well. The previous description is simplified for purposes of illustration and, therefore, is not intended to be limiting.

In one possible illustrative embodiment, a controller may manage a plurality of respective gateway devices communicating via their respective logical broadcast domains. In still another possible embodiment, a controller may provision one or more tunnel servers, for example, to facilitate communications between network devices communicating as part of different, respective logical broadcast domains (e.g., gateways in respective LBDs may communicate via a tunnel server). Likewise, in still another illustrative embodiment, a controller may comprise a master controller that may be used to manage other controllers, for example, although there may, of course, be more than one or even several master controllers, as well as several private networks, in a particular embodiment. As shall become clear later, in an embodiment, although subject matter is not limited in scope in this respect, use of a controller may provide a capability for centralized management of a private network, for example.

A tunnel server may be implemented in software, firmware, hardware or any combination thereof (other than software per se, since software is executed, of course). For example, a tunnel server may comprise a software application initiated by a controller, but potentially executed elsewhere, such as on a separate server, for example; although claimed subject matter is not limited in scope in this respect. Furthermore, in another embodiment, a tunnel server may comprise a network device physically, logically, virtually or non-virtually separate from a controller.

Likewise, in an embodiment, a gateway device may comprise a network device capable of communicating as part of a broadcast domain to discover features of another broadcast domain without human intervention, such as, for example, to generate a broadcast domain configuration of another broadcast domain. Although claimed subject matter is not necessarily limited in scope in this respect, additional example embodiments of a broadcast domain configuration (along with related technology) are discussed in aforementioned U.S. patent application Ser. No. 13/543,729. As described previously, the term gateway device is introduced as a matter of convenience; it is intended that within this specification any network device may include such a capability. For example, a network device may engage in a variety of activities to accomplish this including, but not limited, to any of the following: passively monitoring signal packets, actively probing other network devices, port scanning other network devices, querying other network devices, querying servers, such as a domain controller and/or other server responsible for a directory of broadcast domain features, any combinations thereof, or even other approaches. Thus, although a gateway device may be referred to as a matter of convenience in connection with a broadcast domain, for example, it is to be understood, of course, that a gateway device is provided as merely one illustration of a network device, such as a network device with capability to perform operations, as described, for example, such as, discovery, reflection, communication with a tunnel server, operating as a tunnel server, operating as a controller, etc. Likewise, a network device may be implemented virtually (e.g., logically) or non-virtually (e.g., physically). Furthermore, in this context, without human intervention indicates that processes may be executed without human intelligence being on hand or otherwise generally available to make appropriate adaptations or changes, such as, if unanticipated events take place, for example. Throughout this specification, unless otherwise stated, it is intended that a process or processes be interpreted as being executed without human intervention. Thus, one or more processes may execute satisfactorily to accomplish a particular result, without human intelligence, interaction and/or direction, for example. Thus, in a sense, such processes at least may be said to be performed automatically.

As previously described, in an embodiment, for example, a controller may provide a capability of centralized management of a private network, such as a network comprising one or more logical broadcast domains, for example. As suggested, although claimed subject matter is not necessarily limited in this respect, in an embodiment, for example, a controller may be implemented via a server that is associated with a node on the Internet, for example. However, as also suggested previously, management of a network, such as a private network, (which may, as simply an example, comprise a communications network for a business or an entity, for example) conventionally or typically involves some depth of technical knowledge and/or experience, such as typically may reside in a company's IT department, for example. Unfortunately, however, for small businesses or the like, as non-limiting examples, such knowledge, experience and/or capability may at least in some respects be out of reach, as a result of overhead expense, for example, that may accompany maintaining such a department.

One advantage of employing approaches consistent with embodiments previously discussed and/or related subject matter may be that a communications network may be initiated, expanded, modified and/or maintained yet still realize an associated reduced cost, such as in terms of time, expense, and/or technical depth, etc. in comparison with traditional, conventional or state of the art networking approaches. Of course, medium or large size business may also benefit from such as approach. As will be discussed, additional advantages may also be present in an embodiment.

Possible benefits depending, of course, on particulars of an embodiment may include, for example, providing essentially a "turnkey" mechanism to bring "online" a private network of potentially worldwide geographical scope with roughly little more than an amount of technical knowledge usually employed to operate a standardly available web browser on a standardly available computing device, for example, such as the amount of technical knowledge employed to participate in a social network, such as FACE-BOOK® or GOOGLE+®, as simply illustrative examples. Thus, in an embodiment, a private network "in the cloud" may be managed via a GUI essentially as easily as it is to "friend" someone via FACEBOOK®, for example. Furthermore, in some embodiments, for example, hardware installation or even ownership may not necessarily be involved. Likewise, as alluded to, an embodiment of a private network in accordance with claimed subject matter, for example, may be secure, seamless, scalable and provide real-time, nearly instant (e.g., on demand) service.

As alluded, such embodiments, for example, may be of benefit to smaller businesses, entities or the like, that typically may not have sufficient resources to finance or maintain an IT department on even a modest scale (although, as indicated, larger businesses may likewise benefit). Likewise, as also alluded, such embodiments may leverage, for example, common place technical knowledge possessed by individuals, for example, such as those who may not be technical professionals and/or may possess a passing familiarity with computing and/or communications technology (e.g., an amount of familiarity to use conventional computing devices, such as laptops, for example, and/or to communicate with others via those devices, etc.), but little more. Of course, it is also appreciated that these are merely illustrative examples and it is not intended that claimed subject matter be limited in scope to examples provided merely for illustrative purposes In an embodiment, as an example, although claimed subject matter is not limited in scope in this respect, to leverage commonly available technical knowledge, as an example, at least one graphical user interface (GUI) may be provided on a network device to manage a private network, such as of one or more logical broadcast domains, for example. Likewise, in an embodiment, for example, the network device may be included in the private network. As shall become more clear, such as via non-limiting illustrative examples, by employing a GUI, such as a relational GUI, also explained in more detail below, underlying technical and/or network complexity may be made less apparent (and consequently less distracting, for example) to a user (e.g., largely hidden) while providing a user a capability to manage aspects of a private communications network in a manner that in at least some embodiments may be more aligned with cognitive human processes, for example. It is noted that subject matter scope is not intended to be limited to particular types of networking symbols, particular types of network displayed arrangements or structures, particular types of GUI manipulations, and/or particular actions that may results from particular GUI manipulations. It is also worth noting that a network being managed may have a variety of arrangements, such as flat, tree-like, hierarchical, cyclic, acyclical and/or various combinations.

To provide only a few non-limiting examples here, in an embodiment, simple, but also seamless management capabilities may include: provisioning and/or removing computing and/or memory resources, provisioning and/or removing technical services, provisioning and/or removing software applications, adding and/or removing network users, adding and/or removing network devices, structuring groups of users and/or devices, such as for merger and/or segregation for on-going business projects, etc. As suggested, in this context, in general, resources refer to physical resources, such as may be provided by hardware (e.g., additional memory and/or processing capability). Likewise, in general, applications refer to software-related applications. The term 'services' refers generally to provisioning a capability for use, such as via a particular private network, which may, for example, include provisioning of resources and/or applications for use.

Likewise, although claimed subject matter is not limited in scope to any particular type of GUI, as shall also be clear, nonetheless, a capability for a GUI to be arranged and/or configured to be more aligned with human cognition and/or intuition so as to make network management simpler and/or easier, again, than conventional approaches to network management, may be provided, for example. Similarly, in an embodiment, for example, a GUI, such as a relational GUI, may be structured and/or arranged to be more aligned with usual or typical workflow in an organization or business, again, so as to make network management simpler and/or easier than conventional approaches to network management. However, again, these are only a few illustrative potential capabilities and/or benefits and claimed subject matter is not intended to be limited to illustrative examples such as these.

For example, in an embodiment, in which manipulation of a GUI may be employed to manage a private network, such as one including one or more LBDs, for example, signal packet transmissions through a network may be initiated via (e.g., from) a network device. The initiating network device, nonetheless, need not be included in the private network. Devices included in a private network, as previously discussed, refers to a particular, limited set of network devices able to communicate with other network devices in the particular, limited set, such as via signal packet transmissions, for example, without a need for re-routing and/or redirecting such communications. In contrast, however, a device not included in the private network may be capable of being employed in management of the private network, without necessarily being a device within the private network. Of course, likewise, a device within the private network may also be capable of being employed to manage the private network.

For example, in an embodiment, a network device may be associated with a node and a controller may be associated with another node. Although claimed subject matter is not limited in scope in this respect, thus, in one example, the network device and the controller may respectively be associated with separate nodes, the nodes being accessible via the Internet, as an illustration. Thus, a GUI operating on a network device, for example, may be manipulated, which shall be discussed in more detail in additional examples below, and, as a result, signal packet transmissions may be initiated from a network device to a controller, for example. In this example, a controller may comprise a mechanism for centralized management of a private network, such as previously described. For example, a controller may be implemented on a server, as one example, mentioned previously.

Figure 11:
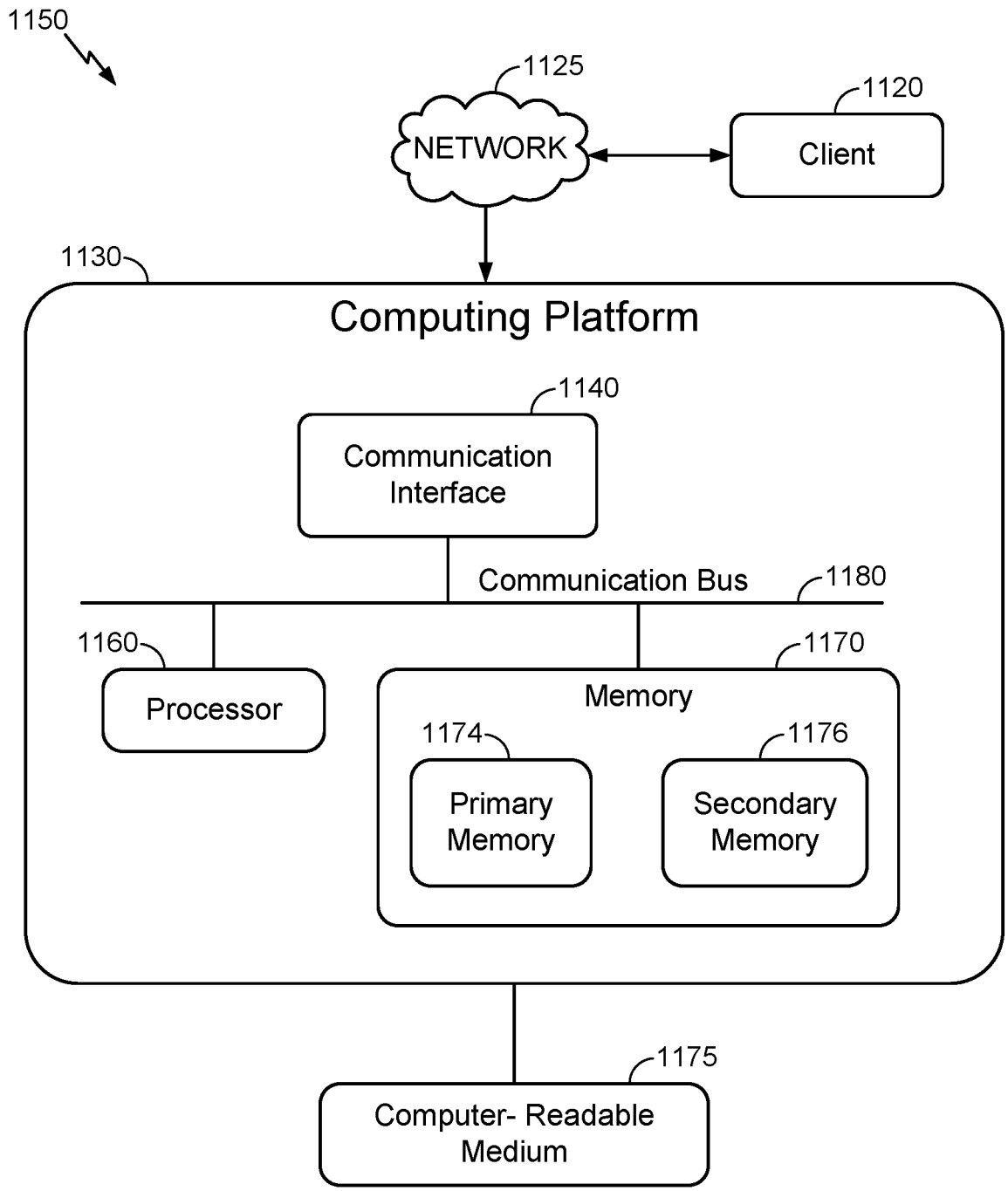
FIG. 11 is a schematic diagram illustrating an embodiment of a client device, a server device and a network.

Since a network device, such as described in this example, includes a GUI, rendering of the GUI takes place. Of course, any one of a host of mechanisms to accomplish this are possible. FIG. 11, for example, illustrates a typical arrangement, described in more detail later. For example, a standard web browser may be employed to render a GUI. Prior to manipulation, previously mentioned, a GUI, for example, may be rendered on a network device based at least in part on signal packet transmissions to the network device that may be initiated by a controller, for example. Thus, a client-server model in which, for example, a controller serves content to a client, such as a network device, may be employed to render a GUI on a network device via a conventional browser without a plug-in, for example. Alternately, a plug-in may be employed to facilitate rendering of a GUI. In still another possible embodiment, a network device may include native software to render a GUI. These, of course, are merely illustrative examples and claimed subject matter is not restricted in scope to these or any other particular approaches, now known or later developed, that may be employed to render a GUI on a device having a display, such as on a network device, for example. Although in this example, the Internet was discussed, in an alternative embodiment, of course, the network may comprise any network, such as a stand-alone private network, an Intranet, a local area network, a wide area network, etc. Thus, as alluded to previously, a network device to manage a private network may be included within the private network, but is not necessarily so.

As suggested previously, signal packet transmissions may be initiated from a network device via manipulation of a GUI. For example, responsive to manipulation of aspects of a GUI, such as clicking an icon, merely as one simple and non-limiting example, signal packet transmissions to a controller may be initiated. Although claimed subject matter is not limited in scope to a particular approach to manipulating a GUI, later additional examples (for purposes of illustration) shall be discussed. Initiated signal packet transmissions may be of use at least in part in terms of management of a private network, such as one comprising one or more logical broadcast domains. Again, as one simple and non-limiting example, initiated signal packet transmissions may result in a controller generating a separate logical broadcast domain that includes several network devices that are included in a particular private network and are accessible to a controller of that network, for example. Similarly, but alternately, initiated signal packet transmissions may result in a controller generating a separate logical broadcast domain that includes several users for a private network, where, for example, users may be accessible via devices on the private network, the devices being associated with the users.

Again, continuing with this illustrative and, therefore, simplified example, three devices on a network may have three separate users associated with respective devices. For example, in an embodiment, a database, such as located on a server that includes a controller for a private network, in an embodiment, may be employed to associate users with devices, as an example. It is, of course, noted that a database may be located anywhere accessible via signal packet transmissions and, therefore, need not necessarily be located on a server that includes a controller. Nonetheless, a GUI may include icons, for example, that may represent three users of a private network, for example. A user of a network device may manipulate a GUI in a manner, such as a drag and drop of icons, again, as a simple and non-limiting example, to another location within the GUI that may indicate that the three users are to be associated in a logical broadcast domain of the private network. GUI manipulation, such as discussed in this simple example, therefore, may initiate one or more signal packet transmissions to a controller. The controller may then, responsive to receiving one or more initiated signal packet transmissions; use a local database, as an example, to identify devices in the private network associated with these users and may generate a logical broadcast domain that includes these devices for these users. Again, this is intended merely as a simplified and non-limiting illustrative example and claimed subject matter is not limited in scope to illustrative GUI examples, such as this.

Although the previous example referred to a single network device, of course, multiple network devices may respectively have GUIs with similar capabilities. Likewise, an embodiment may involve multiple private networks. Furthermore, although a network device may comprise a physical device; likewise, a network device may comprise a virtual device in an embodiment, such as previously indicated. Along similar lines, in a generated LBD, as discussed above, one of the devices associated with one of the users may comprise a physical device, a virtual device or a user may, for example, have both an associated physical device and another associated virtual device, as an example.

As suggested previously, a feature of an embodiment in which a GUI may be employed in connection with management of a private network of one or more logical broadcast domains may relate to implementation of a relational GUI. A relational GUI refers to a capability to visually depict user relationships substantially in accordance with corresponding devices included in a private network. This may be compared, for example, with a non-relational GUI that may provide a depiction according to devices in a private network. Likewise, a relational GUI may be described as being user oriented or user centric. In the latter example, "device" comprises an example of a network-related trait. A non-relational GUI may depict a network in terms of the devices that comprise the network, but not in terms of user relationships. Of course, networks are typically represented in terms of devices. However, a relational GUI includes a capability to represent (e.g., relationally depict or relationally display) a network in terms of user relationships, such as social associations, for example, referred to here as user oriented or user centric. Likewise, in an embodiment, a GUI may re-draw or re-render a particular network in real-time so as to provide a relational depiction of users, rather than devices. Other examples of network-related traits capable of being depicted may include: groups; geography; roles, such as hierarchical roles; social associations; or any combinations thereof. For example, devices or users may be depicted geographically or in terms of groups, discussed in more detail below. Likewise, roles, such as hierarchical roles, of users within an organization may be depicted as well. A depiction of users in terms of roles may be convenient for GUI manipulation, since GUI manipulation applied to a role in order to manage a private network, for example, may be interpreted to mean that the action in terms of network management be replicated for any user having that role.

To continue with this example, in an embodiment, a network device may, as suggested, relationally depict or display a network, such as a private network, in terms of users on the network, rather than in terms of devices on the network. One possible advantage includes a capability to thereby manage the network in a manner more in terms of the particular trait being depicted. For example, a network may be managed or oriented with respect to users, rather than devices, which may, in some situations or environments, turn out to be more useful or desirable. It is noted that the terms depict, display or similar terms may be used interchangeably.

It may be that managing a network that may be more aligned conceptually with a task at hand if depicted relationally in terms of users. In an embodiment in which a network is capable of being depicted relationally (e.g., in terms of relationships), for a relational GUI, it may be possible to re-render a display screen of a GUI so that the network is depicted relationally in terms of users on the network, in place of a representation of the network in terms of devices. Likewise, as suggested, nearly real-time movement between depictions of a network respectively in terms of devices or relationally in terms of users may be useful or desirable.

Another relational depiction may be in terms of groups, e.g., groups of users and/or groups of devices, on a network, as mentioned above. Yet another depiction may be in terms of geography (e.g., geographical location of devices and/or geographical location of users), also alluded to previously. It is, likewise, noted that network management may be carried out in any one of a host of various combinations for depiction or display using a GUI.

As another example, particular technology may comprise another example of a possible depiction. Therefore, a GUI may depict users in terms of hardware device employed, software employed, communication protocol employed, etc. Similarly, roles in an organization, such as a role in sales, a role in engineering, and/or hierarchical roles, such as supervisory relationships, as examples, may be relationally depicted. Alternate depictions for purposes of management of a network, such as oriented to depicting users visually, for example, may mean that managing a communications network may be made easier and/or simpler than conventionally.

As discussed previously, a database, such as a relational database, may store network-related associations (e.g., traits), such as, for example, those described above. Therefore, in an illustrative, yet simplified embodiment, a network device may display a relational GUI. For example, a depiction of a network may be rendered in terms of users, for example. However, it may be desirable to see a display of geographies in which those users are located, for example. In an embodiment, manipulation of a relational GUI on a network device may result in querying a relational database. Signal packet transmissions from a controller may provide query results and a relational GUI may re-render a display of a network of users in terms of geography. Again, this is merely an illustrative, yet simplified, example and it is not intended that claimed subject matter be limited to simplified, illustrative examples, of course.

An example of an embodiment of a private network, such as of one or more LBDs, as may be managed by a GUI, is discussed below. FIG. 1 is a diagram illustrating an embodiment linking more than two logical broadcast domains for management via a GUI. LBDs 209, 210 and 214 are illustrated, for example. A controller 206 and a tunnel server 260 are also illustrated, as described in more detail below. In one embodiment, independent logical broadcast domains may exist before a virtual broadcast domain is to be generated via linking LBDs, for example; although "pre-existing" BDs is not intended to be a requirement. Thus, a GUI may be manipulated to link the LBDs, for example. Gateway devices (GDs) 215, 211, and 208 may be included within respective LBDs or may be generated or produced, such as, in one example embodiment, through installation of a software application on a network device or through another mechanism. GDs 215 and 211 may communicate with controller 206 in one embodiment. Gateway devices 211 and 215 may, for example, transmit a broadcast domain configuration to controller 206. Likewise, controller 206 may provision tunnel server 260 and may notify gateway devices 211 and/or 215 of a network address for tunnel server 260. Likewise, tunnel server 260 may link logical broadcast domains 214 and 210, in an embodiment, initiated via a GUI, as later described. Tunnel server 260 may in another embodiment also link more than two independent logical broadcast domains, such as more than two pre-existing LBDs, for example. Again pre-existing BDs are discussed for illustration purposes, but are not intended as a requirement.

Gateway devices 211 and 215 may transmit signal packets comprising a broadcast domain configuration to tunnel server 260. A tunnel server may forward signal packets, previously received, for example, that may comprise a broadcast domain configuration, such as via forwarding from gateway device 211 to gateway device 215, for example. A tunnel server, such as 260, may also forward signal packets, previously received, for example, that may comprise a broadcast domain configuration, such as forwarding to gateway device 211, for example. A virtual broadcast domain (VBD), therefore, may be generated at least for a period of time by linking logical broadcast domain 214 and logical broadcast domain 210, for example, to generate a private network. For example, icons may be manipulated as previously described.

Depending at least in part on particulars of an embodiment, gateway devices, such as 211 and 215, for example, may, in an embodiment, emulate a received broadcast domain configuration, as shall be explained in more detail infra., and as is discussed, for example, (along with related technology) in previously referenced U.S. patent application Ser. No. 13/543,729, titled "COMMUNICATION BETWEEN BROADCAST DOMAINS," filed on Jul. 6, 2012, by Hankins et al., which is assigned to the assignee of the presently claimed subject matter and is herein incorporated by reference in its entirety; however, these examples, including examples from U.S. patent application Ser. No. 13/543,729, of course, are simply provided as illustrative examples and are not intended to limit claimed subject matter in scope. Gateway devices 211 and 215 may, for example, emulate a received broadcast domain configuration from other sources, such as, but not limited to, controllers, tunnel servers, other gateway devices, etc., for example. In a similar manner, more than two logical broadcast domains may be linked, such as previously mentioned, as a result of GUI manipulation. A gateway device may receive a broadcast domain configuration from a plurality of other gateway devices communicating entirely, primarily or at least partially via other logical broadcast domains, for example.

In one embodiment, as previously disclosed, responsive to signal packets initiated via a GUI executing on a remote network device, for example, a controller may initiate instructions, for gateway devices, such as 208, 211, and 215, for example, to communicate with or via a tunnel server, such as 260, for example. For example, a GUI may be manipulated on a network device, as discussed previously. Gateway devices 208, 211, and 215 may communicate with or via a tunnel server, such as 260. Gateway device 211 may generate a broadcast domain configuration corresponding to logical broadcast domain 210, for example. Gateway device 208 may generate a broadcast domain configuration corresponding to logical broadcast domain 209, for example.

Gateway devices 208 and 211 may transmit respective generated broadcast domain configuration to controller 206. Controller 206 may forward broadcast domain configurations, such as received from other gateway devices, for example, to gateway device 215. Gateway device 215 may emulate multiple received broadcast domain configurations as part of logical broadcast domain 214. For example, as an illustration, network device 216 may discover network device 223 communicating as part of logical broadcast domain 209 and/or network device 212 communicating as part of logical broadcast domain 210.

Continuing with the embodiment of FIG. 1, as an illustration of one possible scenario, network device 216 may communicate a request, such as by transmitting one or more signal packets, such as to network device 223, for example, responsive to GUI manipulation. Thus, via gateway device 215, for example, one or more signal packets comprising a request may be forwarded from network device 216 to tunnel server 260. Tunnel server 260 may, as a result, forward one or more signal packets, such as to gateway device 208, for example. Gateway device 208 may transmit signal packets via a logical broadcast domain, here 209, for example. Since network device 223 comprises part of logical broadcast domain, it may therefore receive a request that may be viewed as an emulation of a request from network device 216 via the now local logical broadcast domain. Thus, network device 223 may accept the request and respond according to established network protocols in an embodiment, for example. In this illustrative example, a response may likewise be forwarded back via gateway device, 208, and tunnel server 260, to gateway device 215 for emulation as part of logical broadcast domain 214. Gateway device 215 may transmit one or more signal packets via logical broadcast domain 214 indicating an accepted request from network device 223 to network device 216. Thus, network devices 216 and 223 may communicate via a virtual broadcast domain comprising LBDs 209 and 214, in this example, and by-passing NAT implemented by routers, for example. Thus, a private network managed by controller 206 has been illustrated by this example. Likewise, controller 206 may be managed via a GUI capable of being rendered on a network device, for example, as described. In an implementation, network devices 216 and 223 may or may not recognize that their transmissions are forwarded via a tunnel server and/or to other logical broadcast domains.

In FIG. 1, routers 202, 203, or 204, for example, may route signal packets, such as between logical broadcast domains or to a controller, such as a master controller. Thus, a gateway device 215 may transmit a generated broadcast domain configuration to a controller or a master controller, such as 206. Controller 206 may store a generated broadcast domain configuration received from a gateway device, such as device 215, for example, using a memory device 207. Memory device 207 may comprise a local storage device or a non-local memory device otherwise accessible by controller 206, for example. In an embodiment, as previously described, likewise a database associating users, devices and other network-related traits may also be stored there.

In one embodiment, routers 202, 203, or 204 may employ network address translation (NAT). NAT if employed in a network may add a layer of additional complexity for some signal packets that are to be transmitted or received. Typically, routers that employ NAT may modify a signal packet by altering a source address of a source device that may be part of a logical broadcast domain (likewise, a router employing NAT may also modify a destination address). Therefore, a signal packet transmission from a router employing NAT may appear as though the signal packet originated from the router rather than having originated elsewhere. Likewise, network devices on a logical broadcast domain may have an intervening router, or a similar device performing network address translation, for example, between the logical broadcast domain and other networks. Therefore, other portions of a network that have other logical broadcast domains, may not conventionally be accessible to devices operating as part of the other broadcast domains, at least not without some form of network address translation conventionally taking place. Likewise, routers employing NAT also may in some situations not necessarily allow signal packets to traverse a particular logical broadcast domain if the packets originate from outside the particular logical broadcast domain (e.g., not permit signal packets to reach a network device that may be part of the particular LBD). However, in an embodiment, for example, such as implementing a private network, NAT may be by-passed, such as previously described, for example. Thus, other devices may be accessible despite intervening routers without a change in infrastructure and with a modest amount of technical know-how. (e.g., via GUI manipulation)

As discussed previously, in an embodiment, a virtual broadcast domain may comprise logical broadcast domain 214, and logical broadcast domain 210. Therefore, network device 216, communicating as part of logical broadcast domain 214, may discover and/or request services from a messaging server 224, communicating as part of logical broadcast domain 210. Also, network device 212, communicating as part of logical broadcast domain 210, may discover and/or request services from a file server 220, communicating as part of logical broadcast domain 214. Of course, claimed subject matter is not limited in scope to example embodiments, such as the foregoing provided for illustrative purposes, for example.

Although claimed subject matter is not limited in scope in this respect, in an embodiment, as was mentioned, a potential feature may include centralized management, such as, for example, of a broadcast domain, and/or multiple broadcast domains, despite, for example, the distributed nature of devices in the respective BDs, such as with intervening independently managed network devices, as occurs in connection with the Internet, as one example. Additionally, in an embodiment, a secure, scalable, real-time, turnkey, web-related private network that is relatively simple and/or easy to maintain, modify and/or manage via a GUI may be set up.

As was discussed, in an embodiment, controller 206 may be accessed via a GUI rendered on a network device. A controller, such as controller 206, may receive broadcast domain configurations from other gateway devices communicating via other logical broadcast domains, whereby more than two logical broadcast domains may be similarly linked such that devices communicating via one of a plurality of logical broadcast domains, may discover and/or request services available via devices communicating via another of the plurality of logical broadcast domains. For example, controller 206 may also receive a broadcast domain configuration from gateway device 208, communicating via logical broadcast domain 209. Controller 206, may also forward other received broadcast domain configurations from logical broadcast domains 214, or 210, for example, to logical broadcast domain 209, for example, to be emulated via gateway device 208 or otherwise emulated.

Referring to FIG. 1, as previously discussed, a broadcast domain configuration may include devices communicating via a virtual private network (VPN), for example. In this context, a VPN refers to a mechanism in which a remote host, such as a network device, communicates with a VPN server to encrypt a communication stream in a manner so that the remote host is able to reasonably securely communicate with other devices of the broadcast domain and in which an intervening router has a configuration that allows the remote host to initiate the VPN even with network address translation being implemented. A device communicating via a VPN, such as virtual device 222, may connect to logical broadcast domain 214, or disconnect from logical broadcast domain 214. Likewise, as discussed with other examples, here, an example embodiment, such as this, one may be manageable via a GUI from a network device.

Likewise, a tunnel server may be accessed and/or managed via a GUI from a network device. In one embodiment, a tunnel server, such as tunnel server 260, shown in FIG. 1, for example, may be employed to also perform functions of a controller. Tunnel server 260 may, for example, receive a broadcast domain configuration. Tunnel server 260 may forward one or more broadcast domain configurations to one or more gateway devices. Tunnel server 260 may forward one or more broadcast domain configurations based at least in part on currently communicating network devices or otherwise, for example, such as stored BD configurations, as another example. Additionally, a linking table or other mechanism, for example, may specify forwarding rules or the like, to, for example, specify linking or additional functionality, such as between logical broadcast domains, for example, to form a virtual broadcast domain. In another embodiment, tunnel server 206 may transmit a portion (e.g., digest or subset) of a generated broadcast domain configuration. For example, in an embodiment, a generated broadcast domain configuration may comprise a selection of a set or subset of features of a logical broadcast domain 210 to be forwarded, such as to one or more gateway devices, for example, by tunnel server 260, operating as a controller, in this illustrative example.

Similarly, virtual devices for a private network may also be managed via a GUI from a network device, even a virtual network device. In an embodiment, emulation may comprise, for example, a first network device simulating another network device via a broadcast domain. Another network device, in this example, may comprise a physical network device, or a virtual network device. Therefore, the emulated device may not exist as a physical piece of hardware, although may be executed or stored on a physical device, of course. An emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a logical broadcast domain without forwarding requests to another network device. Additionally, emulation, in an embodiment, may comprise imitating another network device. However, another network device may exist virtually, and/or may comprise a set instructions being executed via another network device. Although services may appear to be available via a network device, the network device may, therefore, in an embodiment, comprise a virtual network device.

Although claimed subject matter is not limited in scope to illustrative examples, it may nonetheless be useful to provide some simple illustrations to assist in conveying the versatile, convenient and/or robust nature of an interface, e.g. GUI, to manage a private network, such as of one or more logical broadcast domains, such as in the manner suggested previously. As a hypothetical example, imagine an owner of a company or small business desiring to establish a private network with personnel and/or other resources distributed in a variety of separate locations, for example. (Although, again, larger businesses may also benefit) Initially, for example, the owner, let's call him Frank Ramirez, may go to a website to create a personal profile and download software to be installed on his computer, for example. Thus, conventional or typical website hosting may be employed to implement such an embodiment, for example. As a result of software installation on his computer, Frank may be designated as an owner of a private network to be generated by a controller, which may comprise the website from which he downloaded the software (or another website to which he may be directed, for example, by the software, after being installed).

Figure 2:
Figure 10:

FIG. 2 is a schematic diagram illustrating an embodiment of a display screen of a GUI such as, for example, generated as a result of installation of software on Frank's computer. Of course, again, this is merely a simple illustration. However, Frank may provide a photo in display location 610. He may enter his personal profile in fields 620, 630, 640, and 650, such as name, company, phone, etc. Additional fields not shown may, of course, be included. A 'send invitation' button 660 may permit Frank, as an owner of the network, to invite others to join the network as a user. Likewise, FIG. 10 illustrates a message 1100, such as an email, that may be transmitted to permit someone, in this example, Gordon, to join the network being generated by Frank, such as by clicking 'accept connection' 1110.

Figure 3:
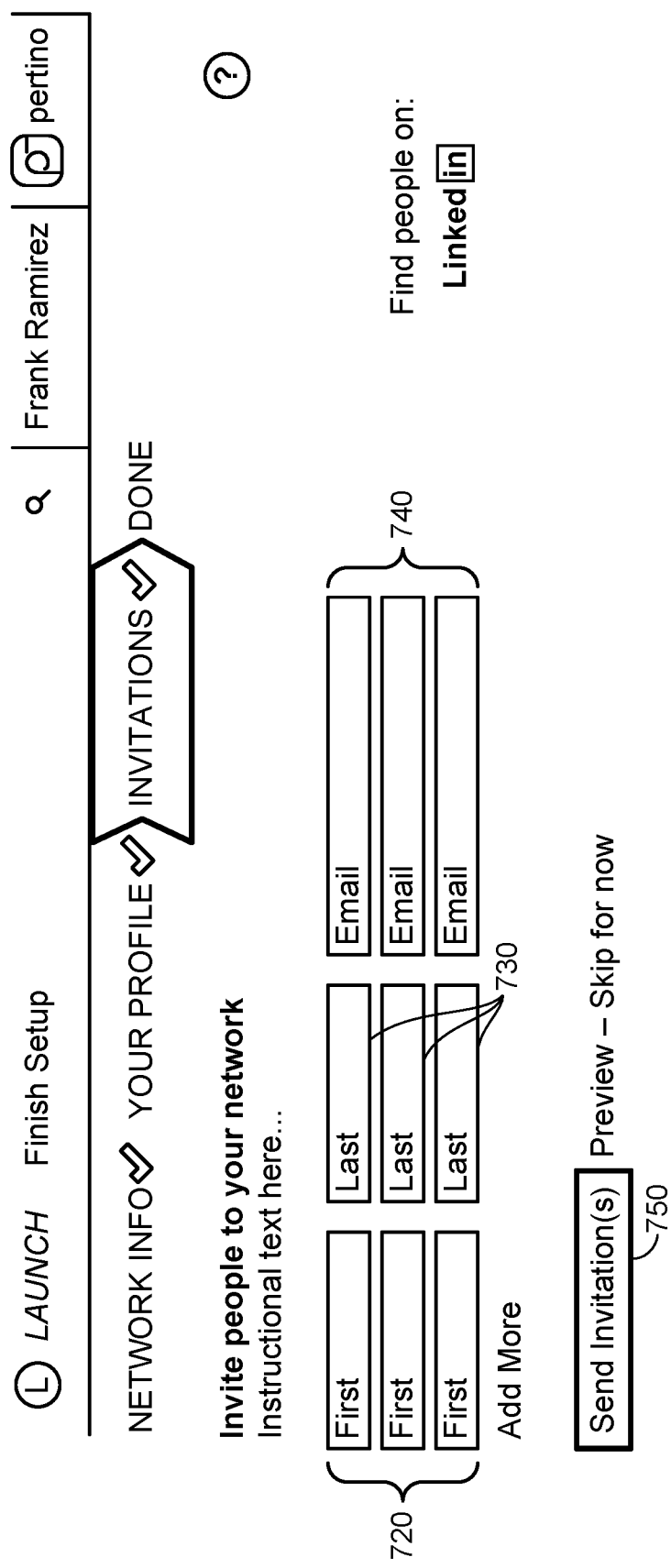

As an owner of the business and creator of a private network (and a user) in this example, Frank may be directed to another display, shown in FIG. 3. Thus, FIG. 3 is a schematic diagram illustrating an embodiment of another display screen of a GUI, for example. Here, in this example, Frank is able to invite others to join the private network he is generating by entering content in fields 720, 730 and 740, and clicking button 750. In this example, with personnel in various disparate locations, being able to invite people to join a private network in this manner may be especially appealing. Likewise, depending at least in part on the embodiment, an owner-user may also specify levels of permission for different users, if desired. It is likewise noted without discussion, since it is well understood technology, that typical mechanisms of authentication would typically be employed and provided as well.

Figure 4:
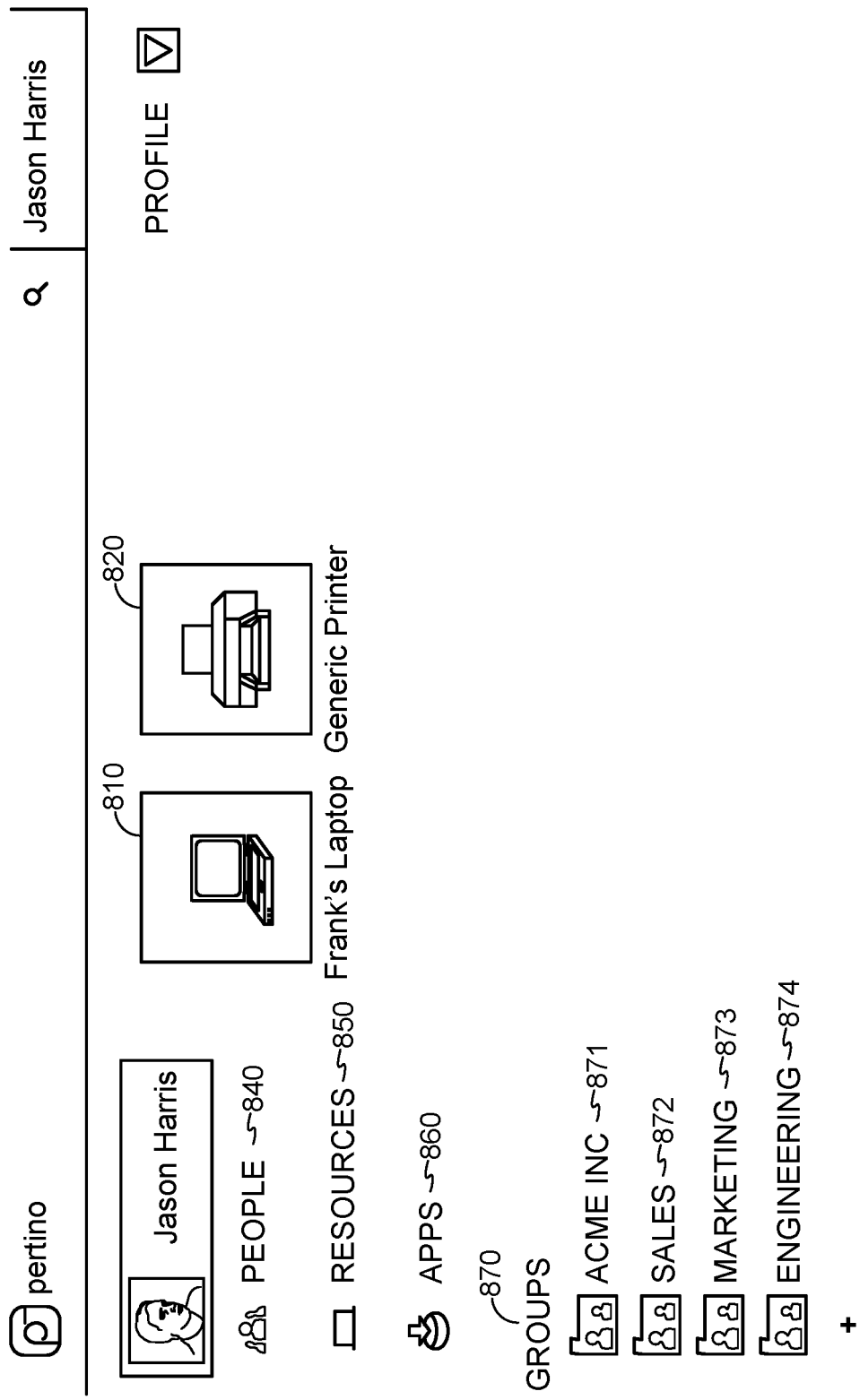

FIG. 4 is a schematic diagram illustrating an embodiment of yet another display screen of a GUI, for example. Here, a user, such as Jason Harris, may add devices, such as someone else's laptop, here Frank's, 810, or a printer, 820, as a device to be associated with them. Of course, network access to the devices and appropriate permissions may be employed, which may exist via a controller, for example.

FIG. 4 also illustrates groups 870 such as Acme, Inc. 871, sales 872, marketing 873, and engineering 874. These are groups that Jason Harris may be able to access for communications, or to form new groups, as previously alluded to and further illustrated below. FIG. 4 also illustrates that this private network includes people (e.g., users) 840, resources (e.g., storage and/or processing capability) 850 and applications 860, also discussed previously and in more detail below. Non-limiting examples of these resource and/or application services may include: infrastructure services, such as providing servers; application services such as email, wikis, file shares, web sites; security services, such as firewalls, web security services and/or network, application and/or user monitoring; and/or monitoring connectivity status in near real time, such as connected or disconnected.

Figure 5:
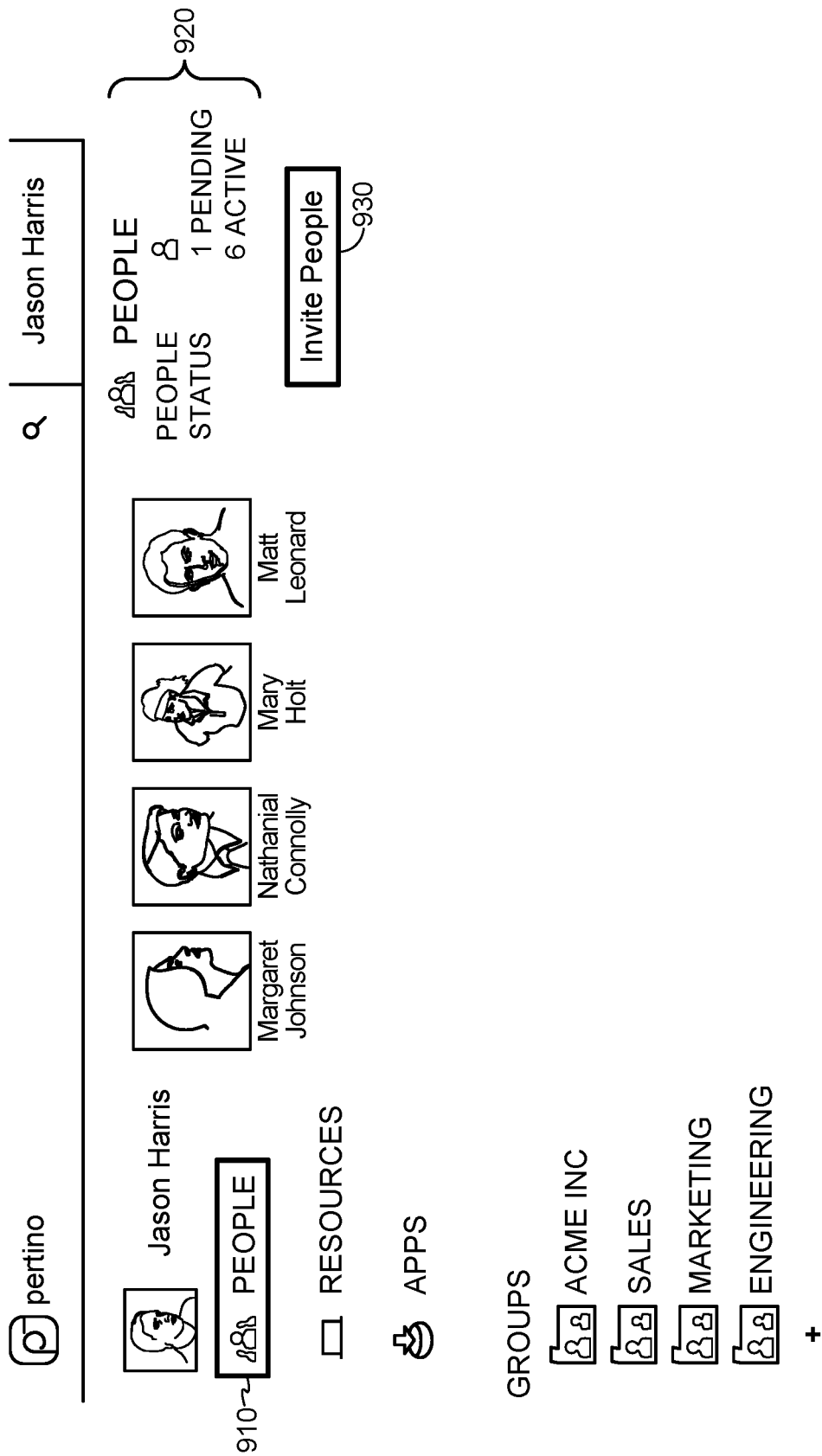

FIG. 5 is a schematic diagram illustrating an embodiment of one more display screen of a GUI, for example, illustrating people 910 associated on this private network. Likewise, on the right hand side, status 920 about active and/or pending users is also provided along with a button 930 to make invitations. Again, these are non-limiting illustrative examples. Nonetheless, a GUI, such as this example display, may be employed so that managing a communications or data network may be nearly as simple as social networking via FACEBOOK® or GOOGLE+®, for example. Thus, for example, a logical broadcast domain may be formed from a subset of users simply through clicking and dragging or a similar GUI operation, if desired, as was previously discussed. Likewise, as shall be illustrated, access to resources, applications, etc., may be added and/or removed as easily as well.

Figure 6:
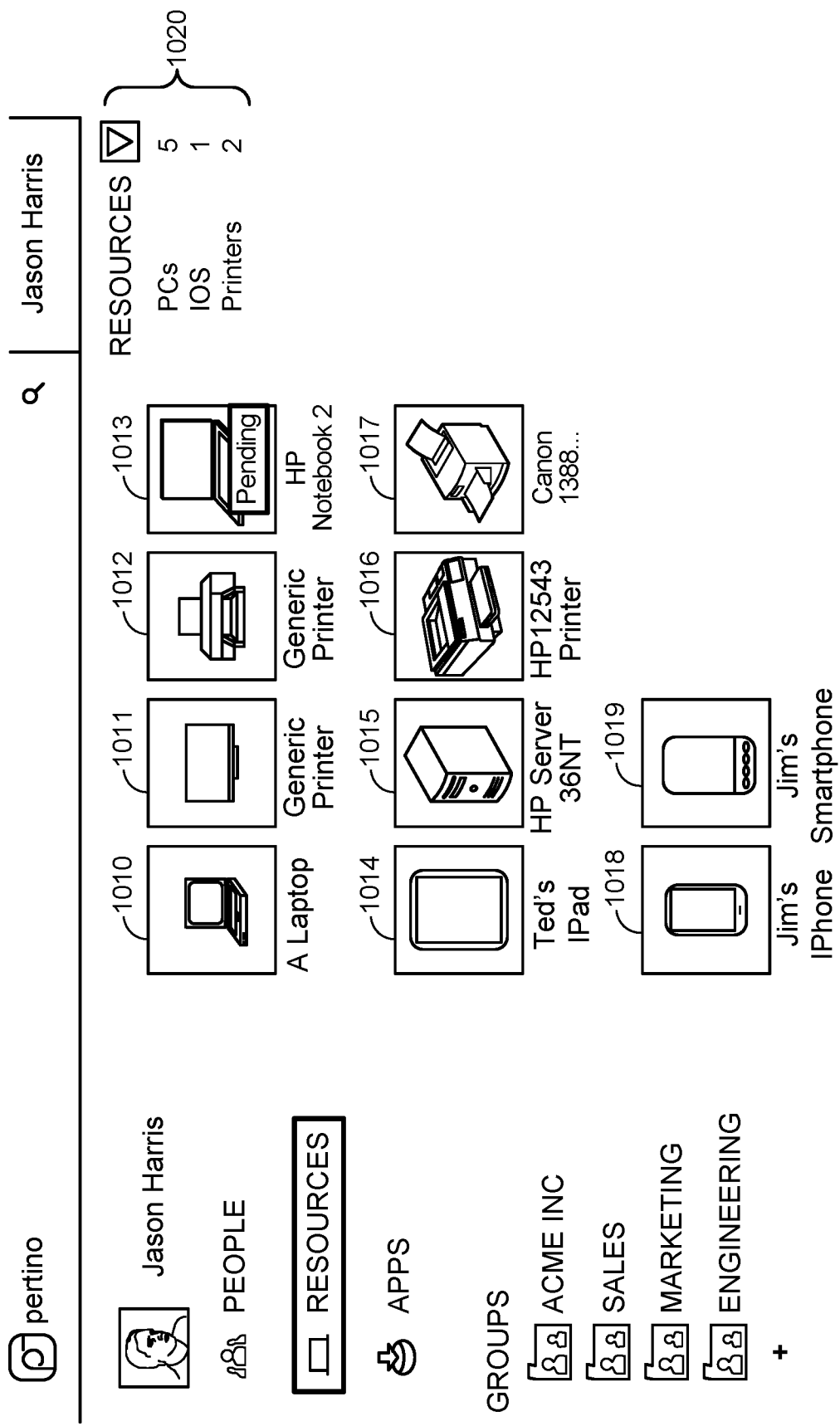

FIG. 6 is a schematic diagram illustrating still another embodiment of a display screen of a GUI, for example, illustrating shared resources, such as 1010-1019, on this private network. As in FIG. 4, on the right hand side, status content 1020 about various available shared resources is illustrated. It is noted that for this display, shared resources shown are not associated with any particular individuals, in comparison, for example with FIG. 3.

Figure 7:
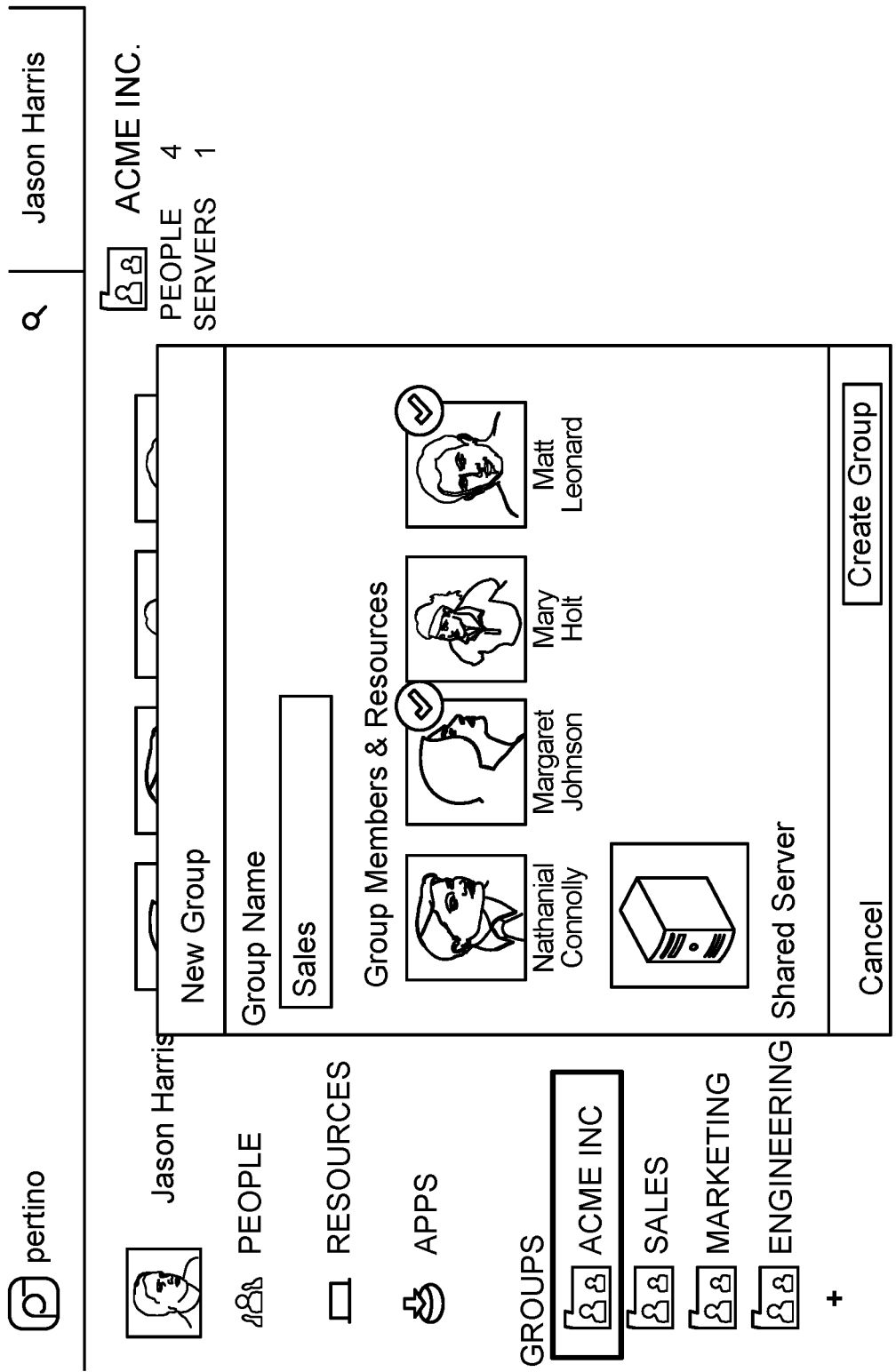

FIG. 7 is a schematic diagram illustrating an embodiment of yet still another display screen of a GUI, for example, illustrating a group Acme, Inc., that includes user and resources. Thus, in this example display, Jason Harris shown as is modifying a group. Again, as suggested, through common place GUI operations, these features may be easily adjusted so that additional resources and/or user, for example, may be added or removed/omitted. Typically, to effect such changes in a private network would involve deep technical know-how, time consuming changes, and/or a call to an IT department. Here, it appears that Jason is adding two new members, Margaret and Matt. To effect the change, Jason is able to click button 1130.

Figure 8:
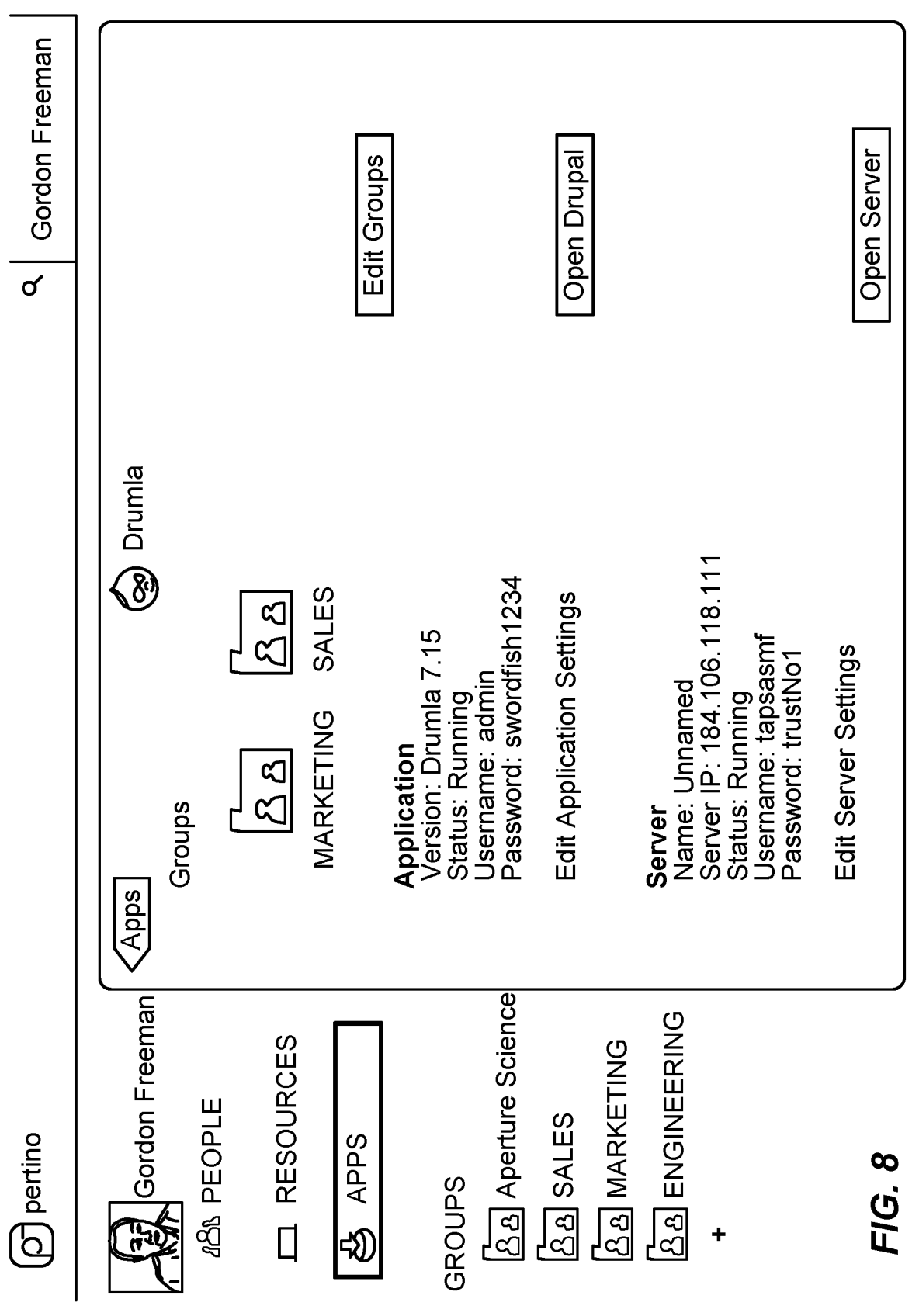
Figure 9:
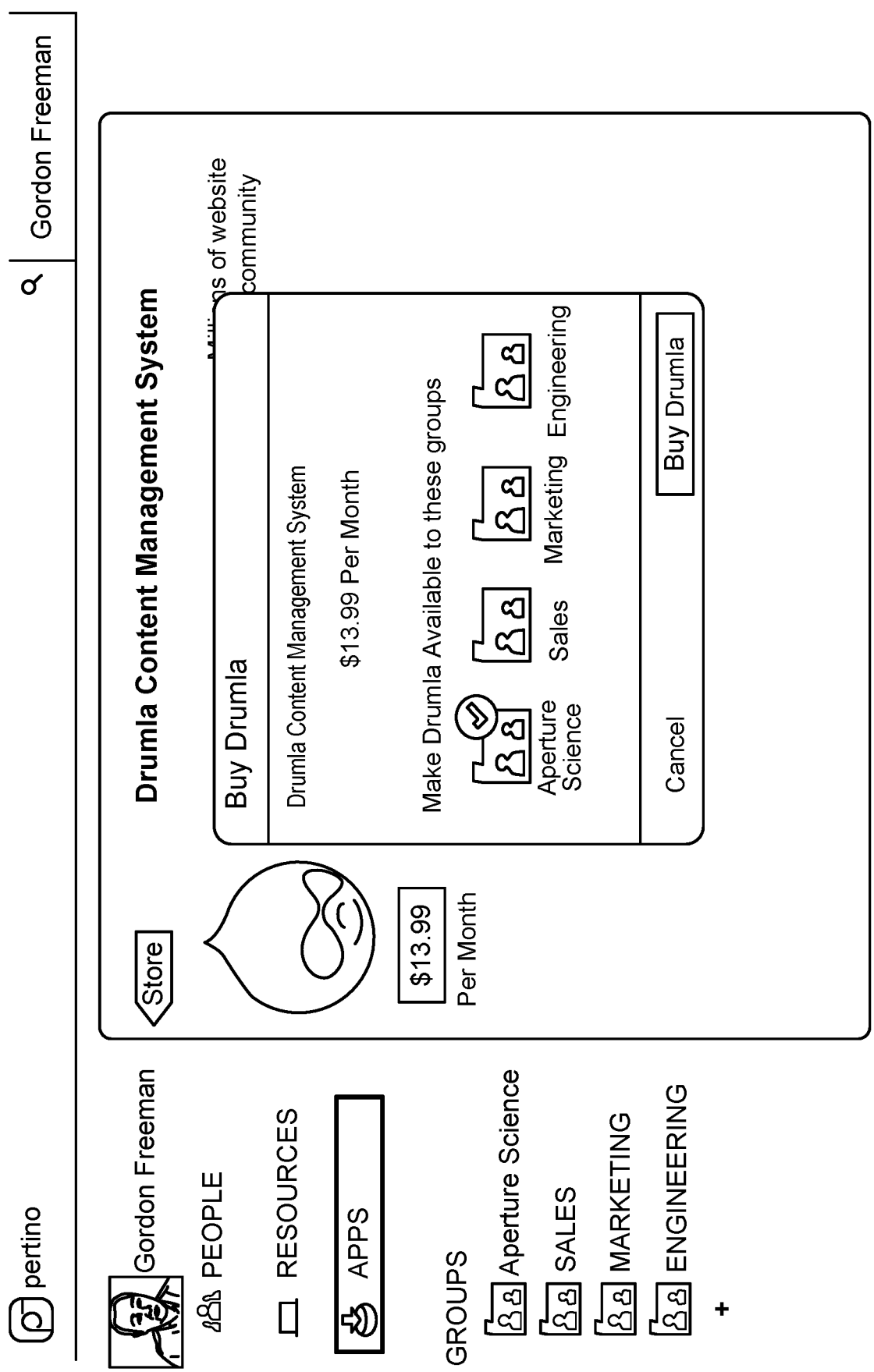

FIGS. 8 and 9 are schematic diagrams illustrating an embodiment of yet still one more display screen of a GUI, for example, illustrating a request, here a purchase, of an application service. FIG. 8 illustrates a variety of applications available to several groups. FIG. 9 illustrates a request that an application available to several groups also be made available to a new group, Aperture Science, which previously did not have the application available. Again, these are simple pointer movements or mouse clicks to effect changes that otherwise would be expensive, time consuming and/or involve deep technical knowledge to accomplish.

Although FIGS. 2-9 illustrate GUI display examples, of course, as previously indicated, claimed subject matter is not limited in scope to any particular GUI or to features of any particular GUI. It may, however, be useful to discuss a few non-limiting examples of common features of GUIs that may be employed in an embodiment, for example. Some of these common features have already been illustrated and some have not. User interfaces use visual conventions to represent content. Some conventions are used to build a display structure with which a user may interact.

A window may comprise an area of a display to show or depict content in a manner that is displayed independently from the rest of displayed content. It is relatively easy for a user to manipulate a window: it may be shown and/or hidden by clicking on an icon or application, and it may be moved by dragging (e.g., by clicking in a certain area of a window—usually the title bar along the top). A window may be placed in front or behind another window, its size may be adjusted, and/or scrollbars may be used to navigate sections. Multiple windows may also be open at one time, in which case separate windows may display different applications and/or files. There may be various types of specialized windows.

A browser window allows a user to move forward and/or backwards through a sequence of electronic documents, such as web pages. Web browsers are an example of these types of windows.

Text terminal windows may permit interaction with text within a graphical interface.

A child window may open automatically or as a result of a user activity in a parent window, for example.

A message window, or dialog box, comprises a type of child window. These are usually small basic windows that are opened by a program to display content to a user and/or get content from a user. They usually have a button to be pushed.

Menus may allow a user to execute commands by selecting from a list of choices. Options may be selected with a mouse or other pointing device within a GUI, which may include a finger or stylus as well in some devices. A keyboard may also be used. Menus may be convenient to show commands that may be available.

A menu bar typically is displayed horizontally across the top of a window. A pull-down menu is commonly associated with this menu type. If a user clicks on a menu option, a pull-down menu may appear.

A menu may have a visible title within the menu bar. Its contents may be revealed if a user selects it with a pointer, for example. A user may then select items within the pull-down menu. If a user clicks elsewhere, content of the menu may disappear.

A context menu is usually invisible until a user performs a specific mouse or similar pointing type device action. Usually, a context menu may appear under the cursor.

Menu extras are usually individual items within or at the side of a menu.

An icon refers to a small picture (e.g., a bit map) that represents objects, such as a file, program, web page, or command. They may be useful as a quick way to execute commands, open documents, and/or run programs, for example.

An interface element that a user interacts with may be referred to as a control (or a widget). Here are some non-limiting examples:

Window: refers to a paper-like rectangle that represents a "window" into a document, form, or design area, for example.

Text box: refers to a box in which to enter text or numbers.

Button: refers to an equivalent to a push-button as may be found on mechanical or electronic instruments.

Hyperlink: refers to text with some kind of indicator (usually underlining and/or color) that indicates that clicking the text will take one to another screen or page.

Drop-down list: refers to a list of items from which to select. The list normally displays items if a button or indicator is clicked.

List box: refers to a GUI control that allows a user to select one or more items from a list contained within a static, multiple line text box.

Combo box: refers to a combination of a drop-down list or list box and a single-line textbox, allowing a user to type a value directly into a control or choose from a list of existing options.

Check box: refers to a box which indicates an "on" or "off" state, such as via a check mark ☑ or a cross ☒ . Sometimes may appear in an intermediate state (shaded or with a dash) to indicate mixed status.

Radio button: refers to a button, similar to a check-box, except that only one item in a group may be selected. Its name comes from the mechanical push-button group on a car radio receiver. Selecting a new item from a group of buttons also deselects the previously selected button.

Cycle button: refers to a button that cycles its content through two or more values, thus enabling selection of one from a group of items.

Data grid: refers to spreadsheet-like grid that allows numbers or text to be entered in rows and columns.

A tab is typically a rectangular box which usually contains a text label or graphical icon associated with a view pane. If activated the view pane or window may display controls associated with that tab; groups of tabs allow a user to switch quickly between different controls. Tabs are usually placed in groups at the top of a window, but may also be grouped on the side or bottom of a window. Tabs are also present in a settings pane of various applications. WINDOWS® operating system, for example, uses tabs in many of its control panels.

A GUI may make an application easier or more practical, and/or efficient to use. At a conceptual level, an interface comprises a mechanism by which people and devices, such as a network device or computing device, communicate. A GUI comprises a visual operating display for a user of an application executing on a computing or network device. GUIs usually have common characteristics, such as windows, icons, menus, and/or push-buttons, collectively, as previously discussed, e.g., pictures that bring forth a certain action and/or an action space. A user may issue commands via a GUI to an application, as discussed previously. A GUI may also work via a network, which may allow a GUI display to be on a network device, such as a client, and an application to be on a server, discussed previously.

After a user has a desired fixation point, however, there may be a practical limit to the amount of content a person may process at one time. A rule of thumb may be to have a reasonable limit on a range of options or choices, such as five or six, for example. Likewise, a top-down approach to organizing a display may be useful in some embodiments. There are several techniques to aid in grouping content, which include:

Color
Graphical Boundaries
Highlighting

A top-down approach also allows for emergent features. An emergent feature refers to a global property of a set that is not evident if one views an item locally. Since global processing tends to be automatic, an emergent feature may reduce attention demand as a user operates a multi-element display. For performance enhancement, as suggested previously, a resulting GUI organization should be reasonable compatible with a user's cognitive and/or intuitive view of a task. Thus, use of a GUI to manage a private network may facilitate leveraging user cognition and/or intuition.

Given a set of content to display, there are several ways one may display content. It may be desirable for a lay out of a display to be in a manner that allows a user to easily locate desired content. Use of de facto GUI screen standards may be desirable, therefore, as previously alluded. Within a window, there are also many standard modes, such as examples previously discussed. A window title is usually at the top. Scroll bars are usually on the right and bottom for vertical and horizontal window movement. A box for closing the window is usually at the top left. Icons for resizing the window are usually at the four corners. A collection of various factors to consider for layout, may include:

Sequence of use
Conventional Usage
Importance
Frequency of use
Generality versus Specificity
Alphabetical or Chronological The goal of a GUI may include allowing a user to concentrate on one or more cognitive tasks at hand. Specific attention devoted to the interface may therefore interfere with and/or adversely affect concentration. This principle may be considered so as to influence (1) the amount of content to present, (2) grouping of content, and/or (3) placement and/or sequencing of content.

A GUI may desirably display content in a manner that may be contextual and/or consistent. A GUI may desirably avoid or reduce unnecessary detail and may use concise wording to conserve screen space. If familiar GUI formats exist, it may be desirable to utilize them, again, as suggested previously. One may group content using color to associate like items. Graphical boundaries may be useful to group like items, especially icons. Other highlighting techniques may include reverse video, brightness, underlining, and/or flashing.

Further, one may desire to sequence content on a display in a manner for a user to comprehend reasonably intuitively so as to facilitate user interaction. As examples, common content may be in common locations across windows. Also, more important content may precede lesser important content. Further, frequently utilized content or commands may be in more prominent locations. Likewise, more general items may precede more specific items.

For purposes of illustration, FIG. 11 is an illustration of an embodiment of a computing platform 1150 that may be employed in a client-server type interaction, such as described supra in connection with rendering a GUI via a network device, for example. In FIG. 11, computing platform 1130 may interface with client 1120, which may comprise features of a conventional client device, for example. Communications interface 1140, processor (e.g., processing unit) 1160, and memory 1170, which may comprise primary memory 1174 and secondary memory 1176, may communicate by way of communication bus 1180, for example. In FIG. 11, client 1120 may represent one or more or more sources of analog, uncompressed digital, lossless compressed digital, or lossy compressed digital formats for content of various types, such as video, imaging, text, audio, etc. in the form physical states or signals, for example. Client 1120 may communicate with computing platform 1130 by way of an Internet connection via network 1125, for example. Although the computing platform of FIG. 11 shows the above-identified elements, claimed subject matter is not limited to computing platforms having only these elements as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 1160 may be representative of one or more circuits, such as digital circuits, to perform at least a portion of a computing procedure or process. By way of example but not limitation, processor 1160 may comprise one or more processors, such as controllers, microprocessors, microcontrollers, application specific integrated circuits, digital signal processors, programmable logic devices, field programmable gate arrays, and the like, or any combination thereof. In implementations, processor 360 may perform signal processing to manipulate signals or states or to construct signals or states, for example.

Memory 1170 may be representative of any storage mechanism. Memory 1170 may comprise, for example, primary memory 1174 and secondary memory 1176, additional memory circuits, mechanisms, or combinations thereof may be used. Memory 370 may comprise, for example, random access memory, read only memory, or one or more data storage devices or systems, such as, for example, a disk drive, an optical disc drive, a tape drive, a solid-state memory drive, just to name a few examples. Memory 1170 may be utilized to store a program, such as one to perform ranking of limited time discounts, as an example. Memory 1170 may also comprise a memory controller for accessing computer readable-medium 1175 that may carry and/or make accessible content, code, and/or instructions, for example, executable by processor 1160 or some other controller or processor capable of executing instructions, for example.

Under the direction of processor 1160, memory, such as cells storing physical states, representing for example, a program, may be executed by processor 1160 and generated signals may be transmitted via the Internet, for example. Processor 1160 may also receive digitally-encoded signals from client 1120.

Network 1125 may comprise one or more communication links, processes, and/or resources to support exchanging communication signals between a client, such as 1120 and computing platform 1130, which may, for example, comprise one or more servers (not shown). By way of example, but not limitation, network 1125 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing platform 1130, as depicted in FIG. 11, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1170 may store cookies relating to one or more users and may also comprise a computer-readable medium that may carry and/or make accessible content, code and/or instructions, for example, executable by processor 1160 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM™), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A network device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A network device may include or may execute a variety of now known, or to be developed operating systems, or derivatives and/or versions, including personal computer operating systems, such as a WINDOWS®, IOS® or LINUX® operating system, or a mobile operating system, such as IOS®, ANDROID®, or WINDOWS MOBILE® operating system, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, FACEBOOK®, LINKEDIN®, TWITTER®, FLICKR®, or GOOGLE+® social networks, to provide only a few examples. A network device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A logical broadcast domain may also be extended to another device communicating as part of another network, such as via a virtual private network (VPN). To support a VPN, logical broadcast domain transmissions may be forwarded to the VPN device via another network. For example, a software tunnel may be created between the logical broadcast domain, and the VPN device. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A logical broadcast domain may communicate via signal packets, such as in a network of participating digital communications, A logical broadcast domain may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A logical broadcast domain may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method of executing computer instructions on at least one computing device in which the at least one computing device includes at least one processor and at least one memory, comprising:
fetching computer instructions from the at least one memory of the at least one computing device for execution on the at least one processor of the at least one computing device;
executing the fetched computer instructions on the at least one processor of the at least one computing device; and
storing in the at least one memory of the at least one computing device any results of having executed the fetched computer instructions on the at least one processor of the at least one computing device;
wherein the computer instructions to be executed comprise computer instructions to manage a private network;
wherein the executing the fetched private network computer instructions further comprise managing the private network of two or more logical broadcast domains at least in part via manipulation of at least one graphical user interface on the at least one computing device, wherein the managing the private network includes provisioning a tunnel server to encapsulate selected signal packets, wherein the private network of two or more logical broadcast domains is able to communicate the selected signal packets via the provisioned tunnel server while bypassing network address translation as to the selected signal packets; and
wherein the managing the private network via manipulation of at least one graphical user interface comprises at least one of the following: managing private network services, managing private network resources, managing private network applications, or any combination thereof.

2. The method of claim 1, wherein the at least one computing device is included within the private network.

3. The method of claim 1, and further comprising: initiating signal packet transmissions through a network from the at least one computing device to a controller; and rendering the at least one graphical user interface on the at least one computing device.

4. The method of claim 3, wherein the network comprises the private network.

5. The method of claim 3, wherein the network comprises the Internet.

6. The method of claim 3, wherein the rendering the at least one graphical user interface comprises rendering the at least one graphical user interface via a browser.

7. The method of claim 3, wherein the managing the private network comprises managing the two or more logical broadcast domains based at least in part on signal packet transmissions initiated via the at least one graphical user interface.

8. The method of claim 7, wherein the signal packet transmissions initiated via the at least one graphical user interface comprise signal packet transmissions initiated by the at least one computing device and received by the controller, the signal packet transmissions being initiated responsive to the manipulation of the at least one graphical user interface.

9. The method of claim 1, and further comprising: rendering the at least one graphical user interface on the at least one computing device by executing native software.

10. The method of claim 9, wherein the managing the private network comprises managing the two or more logical broadcast domains based at least in part on signal packet transmissions initiated by the at least one computing device via the at least one graphical user interface.

11. The method of claim 10, wherein the signal packet transmissions comprise signal packet transmissions initiated by the at least one computing device responsive to the manipulation of the at least one graphical user interface.

12. The method of claim 1, wherein the at least one graphical user interface comprises multiple graphical user interfaces on multiple computing devices, respectively.

13. The method of claim 12, wherein at least one of the multiple computing devices comprises at least one virtual computing device.

14. The method of claim 13, wherein at least one of the multiple computing devices comprises at least one physical computing device.

15. The method of claim 1, wherein at least one of the two or more logical broadcast domains includes at least one physical device.

16. The method of claim 1, wherein the at least one graphical user interface comprises at least one relational graphical user interface; and wherein the managing the private network comprises managing the private network at least in part via manipulation of the at least one relational graphical user interface.

17. The method of claim 16, wherein the managing the private network at least in part via the manipulation of the at least one relational graphical user interface comprises manipulation at least in part with respect to a display, the display one or more relationally depicting users or relationally depicting social associations.

18. The method of claim 17, and further comprising: at least one querying of one or more databases; and rendering the at least one relational display based at least in part on the results of the at least one database querying.

19. The method of claim 18, wherein the one or more databases comprises one or more databases of network-related associations.

20. The method of claim 18, wherein the at least one querying of one or more databases comprises at least one querying of one or more databases residing on the controller.

21. The method of claim 20, wherein the at least one querying of the one or more databases residing on the controller comprises at least one querying of one or more databases by the at least one computing device via signal packet transmissions.

22. The method of claim 21, wherein the rendering includes rendering the at least one relational display of the private network in place of another display of the private network.

23. The method of claim 22, wherein the rendering the at least one relational display of the private network in place of another display of the private network includes at least one querying of one or more databases by the at least one computing device.

24. The method of claim 23, wherein the one or more databases comprises one or more databases of network-related associations.

25. The method of claim 23, wherein the at least one querying of the one or more databases comprises at least one querying of one or more relational databases.

26. The method of claim 25, wherein the one or more relational databases comprises one or more relational databases of network-related associations.

27. The method of claim 1, wherein the managing private network services, the managing private network resources, the managing private network applications, or any combination thereof comprises handling requests for at least one of the following: provisioning hardware computing resources having processing capabilities, removing hardware computing resources having processing capabilities, provisioning hardware memory resources, removing hardware memory resources, provisioning software applications, removing software applications, adding network users, removing network users, adding network devices, removing network devices, or any combination thereof.

28. The method of claim 27, wherein the requests include purchases.

29. The method of claim 1, wherein the two or more logical broadcast domains includes one or more virtual broadcast domains.

30. A method of executing computer instructions on at least one computing device in which the at least one computing device includes at least one processor and at least one memory, comprising:
fetching computer instructions from the at least one memory of the at least one computing device for execution on the at least one processor of the at least one computing device;
executing the fetched computer instructions on the at least one processor of the at least one computing device; and
storing in the at least one memory of the at least one computing device any results of having executed the fetched computer instructions on the at least one processor of the at least one computing device;
wherein the computer instructions to be executed comprise computer instructions to manage a private network;
wherein the executing the fetched private network computer instructions further comprise providing a capability to modify the private network via manipulating a graphical user interface on a second computing device different than the at least one computing device;
wherein the manipulation of the graphical user interface results in provisioning a tunnel server to encapsulate selected signal packets, and further results in one or more changes to two or more logical broadcast domains of the private network, wherein the two or more logical broadcast domains are able to communicate the selected signal packets via the provisioned tunnel server while bypassing network address translation as to the selected signal packets and
wherein the one or more changes to two or more broadcast domains of the private network comprises at least one of changes to private network services, changes to private network resources, changes to private network applications, or any combination thereof.

31. The method of claim 30, wherein the one or more changes to the two or more logical broadcast domains comprises one or more changes to one or more configurations of the two or more logical broadcast domains.

32. The method of claim 30, wherein the at least one graphical user interface comprises at least one relational graphical user interface.

33. The method of claim 32, wherein the manipulating the at least one relational graphical user interface comprises manipulation at least in part with respect to a display, the display one or more of relationally depicting users or relationally depicting social associations.

34. The method of claim 30, wherein the two or more logical broadcast domains includes one or more virtual broadcast domains.

35. A method of executing computer instructions on at least one computing device in which the at least one computing device includes at least one processor and at least one memory, comprising:
fetching computer instructions from the at least one memory of the at least one computing device for execution on the at least one processor of the at least one computing device;
executing the fetched computer instructions on the at least one processor of the at least one computing device; and
storing in the at least one memory of the at least one computing device any results of having executed the fetched computer instructions on the at least one processor of the at least one computing device;
wherein the computer instructions to be executed comprise computer instructions to manage a private network;
wherein the executing the fetched private network computer instructions further comprise receiving signal packet transmissions to result in managing a private network of two or more logical broadcast domains, wherein the managing the private network includes provisioning a tunnel server to encapsulate selected signal packets, wherein the two or more logical broadcast domains are able to communicate the selected signal packets via the provisioned tunnel server while bypassing network address translation as to the selected signal packets; and
wherein the computer instructions to manage the private network comprise computer instructions to at least one of: provision hardware computing resources having processing capabilities, remove hardware computing resources having processing capabilities, provision hardware memory resources, remove hardware memory resources, provision software applications, remove software applications, add network users, remove network users, add network devices, and remove network devices, or any combination thereof.

36. The method of claim 35, wherein the receiving comprises receiving at a controller of the private network.

37. The method of claim 36, wherein the signal packet transmissions received at the controller are sent to the controller at least in part responsive to the manipulation of at least one graphical user interface.

38. The method of claim 37, wherein the at least one graphical user interface is rendered at least in part responsive to the signal packet transmissions initiated from the controller.

39. The method of claim 38, wherein the at least one graphical user interface is rendered on a second computing device different than the at least one computing device.

40. The method of claim 39, wherein the at least one graphical user interface comprises multiple graphical user interfaces respectively on multiple computing devices different than the at least one computing device.

41. The method of claim 39, wherein the at least one graphical user interface comprises at least one relational graphical user interface.

42. The method of claim 41, wherein the at least one relational graphical user interface one or more relationally depicts users and relationally depicts social associations.

43. A method of executing computer instructions on at least one computing device in which the at least one computing device includes at least one processor and at least one memory, comprising:
    fetching computer instructions from the at least one memory of the at least one computing device for execution on the at least one processor of the at least one computing device;
    executing the fetched computer instructions on the at least one processor of the at least one computing device; and
    storing in the at least one memory of the at least one computing device any results of having executed the fetched computer instructions on the at least one processor of the at least one computing device;
    wherein the computer instructions to be executed comprise computer instructions to manage a private network;
    wherein the executing the fetched private network computer instructions further comprise initiating transmission of signals to be used at least in part to generate at least one graphical user interface capable of managing a private network of two or more logical broadcast domains, wherein the managing the private network includes provisioning a tunnel server to encapsulate selected signal packets, wherein the two or more logical broadcast domains are able to communicate the selected signal packets via the provisioned tunnel server while bypassing network address translation as to the selected signal packets; and
    wherein the computer instructions to manage the private network comprise computer instructions to at least one of: provision hardware computing resources having processing capabilities, remove hardware computing resources having processing capabilities, provision hardware memory resources, remove hardware memory resources, provision software applications, remove software applications, add network users, remove network users, add network devices, and remove network devices, or any combination thereof.

44. The method of claim 43, wherein the initiating comprises initiating transmissions from a controller; and wherein the signals comprise one or more signal packets.

45. The method of claim 43, wherein the at least one graphical user interface is capable of managing the private network in response to manipulation of the at least one graphical user interface.

46. The method of claim 45, wherein the managing includes initiating transmission of signal packets to be received at a controller of the private network.

47. The method of claim 43, wherein the at least one graphical user interface comprises at least one relational graphical user interface.

48. The method of claim 47, wherein the at least one relational graphical user interface one or more relationally depicts users and relationally depicts social associations.

49. A method of executing computer instructions on at least one computing device in which the at least one computing device includes at least one processor and at least one memory, comprising:
    fetching computer instructions from the at least one memory of the at least one computing device for execution on the at least one processor of the at least one computing device;
    executing the fetched computer instructions on the at least one processor of the at least one computing device; and
    storing in the at least one memory of the at least one computing device any results of having executed the fetched computer instructions on the at least one processor of the at least one computing device;
    wherein the computer instructions to be executed comprise computer instructions to manage a private network;
    wherein the executing the fetched private network computer instructions further comprise managing the private network of two or more logical broadcast domains via a user centric relational graphical user interface, wherein the managing the private network includes provisioning a tunnel server to encapsulate selected signal packets, wherein the two or more logical broadcast domains are able to communicate the selected signal packets via the provisioned tunnel server while bypassing network address translation as to the selected signal packets; and
    wherein the managing the private network comprises at least one of the following: managing private network services, managing private network resources, managing private network applications, or any combination thereof.

50. The method of claim 49, wherein the user centric relational graphical user interface is rendered on a device remote from the private network.

51. The method of claim 49, wherein the managing comprises manipulating features of the user centric relational graphical user interface that result in changes to the private network.

52. The method of claim 51, wherein the changes include at least one of the following: provisioning hardware computing resources having processing capabilities, removing hardware computing resources having processing capabilities, provisioning hardware memory resources, removing hardware memory resources, provisioning software applications, removing software applications, adding network users, removing network users, adding network devices, removing network devices or any combination thereof.

53. An apparatus comprising:
    a computing device including at least one processor, at least one memory, and at least one display;
    wherein the computing device to execute computer instructions on the at least one processor, to fetch the computer instructions from the at least one memory for execution on the at least one processor, and to store in the at least one memory any results to be generated from the execution of the computer instructions;

wherein the computing device is further to execute the computer instructions to manage the private network via a user centric relational graphical user interface, wherein to manage includes to provision a tunnel server to encapsulate selected signal packets;

wherein the private network to be managed includes two more or logical broadcast domains to communicate the selected signal packets via the provisioned tunnel server while network address translation is to be bypassed as to the selected signal packets; and wherein to manage the private network further comprises to manage at least one of the following: provisioning private network services, removing private network services, provisioning private network resources, removing private network resources, provision private network applications, removing private network applications, or any combination thereof.

54. The apparatus of claim 53, wherein the computing device is remote from the private network.

55. The apparatus of claim 53, wherein the user centric relational graphical user interface includes features that if manipulated result in changes to the private network.

56. The apparatus of claim 55, wherein the changes to include at least one of the following: provisioning hardware computing resources having processing capabilities, removing hardware computing resources having processing capabilities, provisioning hardware memory resources, removing hardware memory resources, provisioning software applications, removing software applications, adding network users, removing network users, adding network devices, removing network devices, or any combination thereof.

57. An article comprising: a non-transitory storage medium having stored thereon computer instructions executable by at least one computing device, the at least one computing device including at least one processor and at least one memory, wherein the at least one computing device to execute the computer instructions on the at least one processor, to fetch the computer instructions from the at least one memory for execution on the at least one processor, and to store in the at least one memory of the at least one computing device any results to be generated from the execution on the at least one processor of the computer instructions;

the executable computer instructions to manage a private network, wherein to manage includes to provision a tunnel server to encapsulate selected signal packets, wherein the private network comprises two or more logical broadcast domains to be managed at least in part via manipulation of a user centric relational graphical user interface;

wherein the two or more logical broadcast domains to form the private network to be managed are to communicate the selected signal packets via the provisioned tunnel server while network address translation is to be bypassed as to the selected signal packets; and wherein to manage the private network further comprises to manage at least one of the following: provisioning private network services, removing private network services, provisioning private network resources, removing private network resources, provision private network applications, removing private network applications, or any combination thereof.

58. The article of claim 57, wherein the at least one computing device comprises a computing device remote from the private network.

59. The article of claim 57, wherein the user centric relational graphical user interface includes features that if manipulated result in changes to the private network.

60. The article of claim 59, wherein the changes to include at least one of the following: provisioning hardware computing resources having processing capabilities, removing hardware computing resources having processing capabilities, provisioning hardware memory resources, removing hardware memory resources, provisioning software applications, removing software applications, adding network users, removing network users, adding network devices, removing network devices or any combination thereof.

61. An apparatus comprising:

a computing device including at least one processor, at least one memory, and at least one display;

wherein the computing device to execute computer instructions on the at least one processor, to fetch the computer instructions from the at least one memory for execution on the at least one processor, and to store in the at least one memory any results to be generated from the execution of the computer instructions;

wherein the computing device is further to execute the computer instructions to manage a private network, via at least in part manipulation of at least one graphical user interface, wherein to manage the private network includes to provision a tunnel server to encapsulate selected signal packets, wherein the private network comprises two or more logical broadcast domains;

wherein the two or more logical broadcast domains to form the private network to be managed are to communicate the selected signal packets via the provisioned tunnel server while network address translation is to be bypassed as to the selected signal packets; and wherein to manage the private network further comprises to manage at least one of the following: provisioning private network services, removing private network services, provisioning private network resources, removing private network resources, provision private network applications, removing private network applications, or any combination thereof.

62. The apparatus of claim 61, wherein the computing device is included within the private network.

63. The apparatus of claim 61, wherein the private network is further to comprise a controller and, wherein the computer instructions are further to comprise computer instructions to initiate signal packet transmissions via the at least one graphical user interface, the signal packet transmissions to be received by the controller, the signal packet transmissions further to be initiated responsive to the manipulation of the at least one graphical user interface.

64. The apparatus of claim 61, wherein the at least one graphical user interface comprises at least one relational graphical user interface.

65. The apparatus of claim 64, wherein the at least one relational graphical user interface to relationally depict one or more users or to relationally depict social associations.

66. An article comprising: a non-transitory storage medium having stored thereon computer instructions executable by at least one computing device, the at least one computing device including at least one processor and at least one memory, wherein the at least one computing device is to execute the computer instructions on the at least one processor, to fetch the computer instructions from the at least one memory for execution on the at least one processor, and to store in the at least one memory of the at least one computing device any results to be generated from the execution on the at least one processor of the computer instructions;

the executable computer instructions comprising computer instructions to manage a private network at least in part via manipulation of at least one graphical user interface, wherein to manage the private network includes to provision a tunnel server to encapsulate selected signal packets, wherein the private network comprises two or more logical broadcast domains;

wherein the two or more logical broadcast domains to form the private network to be managed are to communicate the selected signal packets via the provisioned tunnel server while network address translation is to be bypassed as to the selected signal packets; and wherein to manage the private network further comprises to manage at least one of the following: provisioning private network services, removing private network services, provisioning private network resources, removing private network resources, provision private network applications, removing private network applications, or any combination thereof.

67. The article of claim 66, wherein the at least one computing device is to comprise a computing device remote from the private network.

68. The article of claim 66, wherein the private network further comprises a controller, and wherein the instructions are further to initiate signal packet transmissions via the manipulation of the at least one graphical user interface, the signal packet transmissions further to be initiated to be received by the controller.

69. The article of claim 66, wherein the at least one graphical user interface comprises at least one relational graphical user interface with respect to the display.

70. The article of claim 69, wherein the at least one relational graphical user interface to relationally depict one or more users or relationally depict social associations.

* * * * *